(12) United States Patent
Gonzalez-Wertz et al.

(10) Patent No.: US 12,705,562 B2
(45) Date of Patent: Aug. 11, 2026

(54) DYNAMIC MATURITY MODEL

(71) Applicant: INTERNATIONAL BUSINESS MACHINES CORPORATION, Armonk, NY (US)

(72) Inventors: Cristene Gonzalez-Wertz, Lancaster, PA (US); Francis Joseph Puglise, Sunny Isles Beach, FL (US); Kirsten Crysel Palmer, Kennesaw, GA (US); David Durbano, Seattle, WA (US); Jason Kinslow, Glen Allen, VA (US); Lisa Fisher, Johannesburg (CA); Glen Garner, Manly West (AU); Jacob Dencik, Brussels (BE); Sarah Diane Green, Chandler, AZ (US); Jeffery Charles Varney, Houston, TX (US); Hebatallah Nashaat, Cairo (EG); Analese Lutz, Ann Arbor, MI (US); Stan Kevin Daley, Espanola, NM (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 18/321,421

(22) Filed: May 22, 2023

(65) Prior Publication Data

US 2024/0394635 A1 Nov. 28, 2024

(51) Int. Cl.
*G06Q 10/0637* (2023.01)
*G06F 40/40* (2020.01)

(52) U.S. Cl.
CPC ......... *G06Q 10/0637* (2013.01); *G06F 40/40* (2020.01)

(58) Field of Classification Search
None
See application file for complete search history.

(56) References Cited

U.S. PATENT DOCUMENTS 8,880,682 B2 11/2014 Bishop
10,997,532 B2 5/2021 Govindugari
(Continued)

FOREIGN PATENT DOCUMENTS

WO WO2021138216 A1 7/2021
WO WO-2021138238 A1 * 7/2021 ............... G06N 7/01

OTHER PUBLICATIONS

Anonymous, System and Method to Define AIOps Implementation Evaluating Industry Aspects for the Maturity Model, IP.com, Jun. 2021, 9 pages. (Year: 2021).*
(Continued)

*Primary Examiner* — Amanda Gurski
(74) *Attorney, Agent, or Firm* — Elliot J. Shine, Esq.; Heslin Rothenberg Farley & Mesiti P.C.; George S. Blasiak, Esq.

(57) ABSTRACT

Methods, computer program products, and systems are presented. The method computer program products, and systems can include, for instance: processing one or more text based document defining a maturity model, wherein the maturity model defines a plurality of domains, and for at least one domain of the second plurality of domains, capabilities are associated to respective different maturity levels of the at least one domain, wherein the processing the one or more text based document includes applying natural language processing to extract from the one or more text based document a parameter value dataset.

20 Claims, 15 Drawing Sheets

(56) References Cited

U.S. PATENT DOCUMENTS

2018/0314993 A1 11/2018 Kumar
2020/0073639 A1* 3/2020 Prasad ...................... G06F 8/10
2020/0364346 A1* 11/2020 Gourisetti ................. G06F 8/20
2022/0092510 A1 3/2022 Orzechowski

OTHER PUBLICATIONS

Anonymous; DevOps Adoption Method (Lodestar)—An adaptive assessment & recommendation using curated question bank and knowledge warehouse powered by machine learning algorithms; IP.com; IPCOM000263438D; Aug. 31, 2020; 6 pages.
Anonymous; Method for Valuating Maturity of Explainability Trust in Cognitive System; IP.com; IPCOM000270109D; Jun. 5, 2022; 9 pages.
Anonymous; System and Method to Define AIOps Implementation Evaluating Industry Aspects for the Maturity Model; IP.com; IPCOM000266223D; Jun. 24, 2021; 9 pages.
Deloitte; Digital Maturity Model—Achieving digital maturity to drive growth; Feb. 2018; Deloitte Digital; 24 pages.
Krol, Karol et al; Analytics Maturity Models: An Overview; Information 2020; Mar. 2, 2020; 19 pages.

* cited by examiner

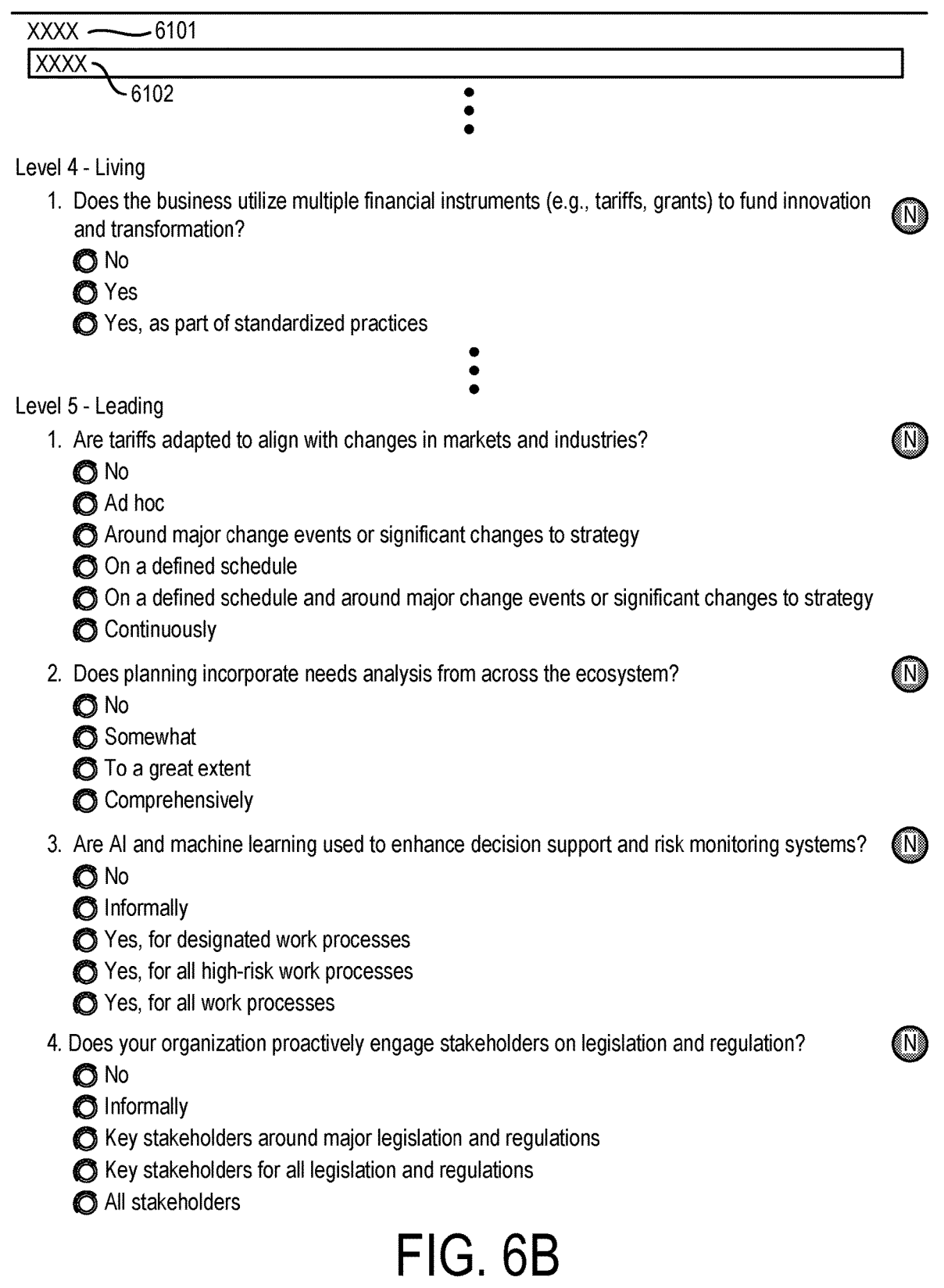

XXXX 6101

XXXX 6102

Level 4 - Living

1. Does the business utilize multiple financial instruments (e.g., tariffs, grants) to fund innovation and transformation? (N)
   - No
   - Yes
   - Yes, as part of standardized practices Level 5 - Leading 1. Are tariffs adapted to align with changes in markets and industries? (N)
   - No
   - Ad hoc
   - Around major change events or significant changes to strategy
   - On a defined schedule
   - On a defined schedule and around major change events or significant changes to strategy
   - Continuously
2. Does planning incorporate needs analysis from across the ecosystem? (N)
   - No
   - Somewhat
   - To a great extent
   - Comprehensively
3. Are AI and machine learning used to enhance decision support and risk monitoring systems? (N)
   - No
   - Informally
   - Yes, for designated work processes
   - Yes, for all high-risk work processes
   - Yes, for all work processes
4. Does your organization proactively engage stakeholders on legislation and regulation? (N)
   - No
   - Informally
   - Key stakeholders around major legislation and regulations
   - Key stakeholders for all legislation and regulations
   - All stakeholders

FIG. 6B

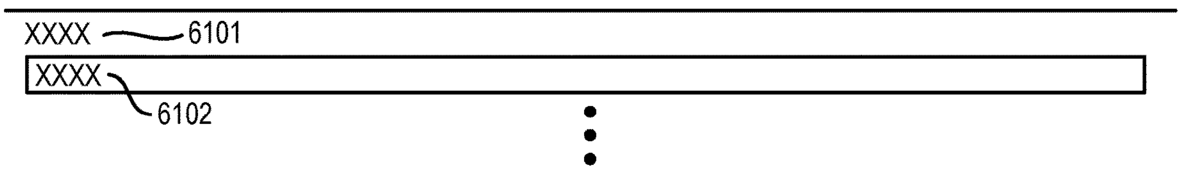

3 Technology

This domain covers the technology capabilities and solutions that enable employees to fulfill organizational roles efficiently. It delivers services to meet the needs of the business through advanced technologies, the integration of IT, OT, AI, and communications technologies, and flexible, secure architecture.

Level 1 - Evaluating

1. Does data transfer and conflict resolution occur between systems?

- No
- Partially
- Yes, for critical data
- Yes, for all data

4 Sustainability

This domain focuses on integration of sustainability and environmental focus in operations. It aligns national goals to organizational plans and provides a mechanism for setting and monitoring the impact of operations, as well as planning for actions to promote decarbonization and mitigate environmental damage.

Level 1 - Evaluating

1. Are you compliant with regulatory, industry and other required sustainability standards?

- No
- Informally
- Assessed
- Assessed and benchmarked
- Assessed, benchmarked, and analyzed and acted upon

FIG. 6D

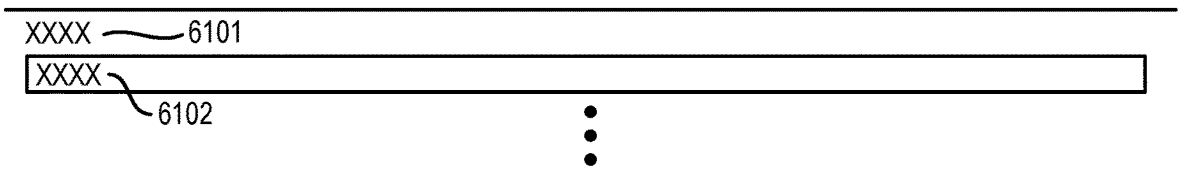

5 Grid Operations

Execution of real-time operations in the distribution and transmission network. The domain provides capabilities to operate and maintain the grid and and ensure a safe and reliable flow of power. It covers the resilience of the grid, future planning, monitoring, emergency response, and expansion based on internal and external factors.

Level 1 - Evaluating

1. Do you leverage real-time customer reports in addition to indications from equipment to identify and isolate outages? 
   - No
   - Somewhat
   - To a great extent
   - Comprehensively 6 Work & Asset Management This domain supports the objectives of maintaining the energy delivery infrastructure to the required safety, functional, security and reliability levels. It explores use of advanced technologies in predictive maintenance and workflow optimization to enable effective planning and monitoring using external data from weather and vegetation information.

Level 1 - Evaluating

1. Have failure analysis and design standards been developed for selected asset classes? 
   - No
   - Informally
   - Yes, for designated assets
   - Yes, for all high-risk assets
   - Yes, for all assets

FIG. 6E

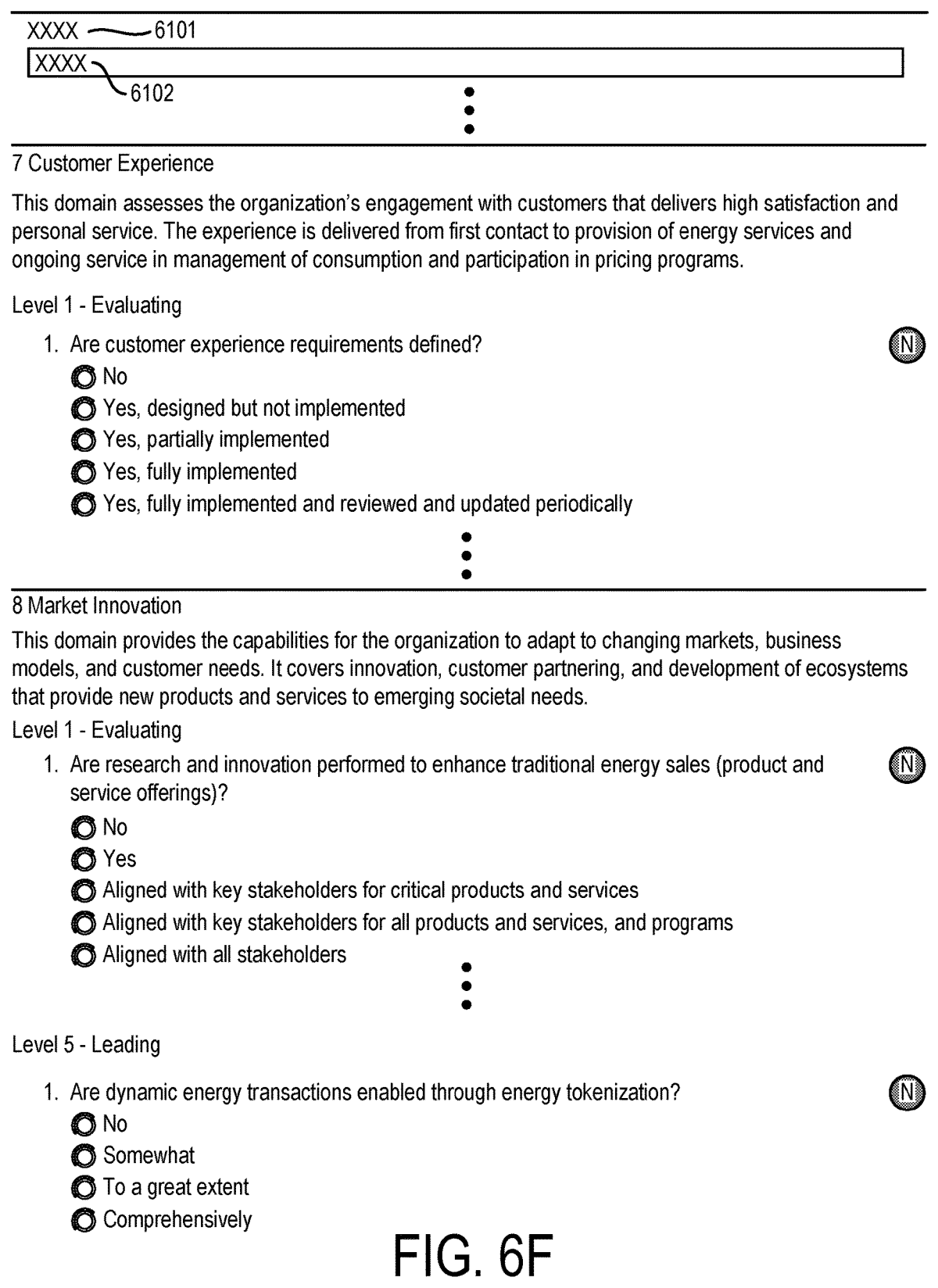

XXXX 6101

XXXX 6102

7 Customer Experience

This domain assesses the organization's engagement with customers that delivers high satisfaction and personal service. The experience is delivered from first contact to provision of energy services and ongoing service in management of consumption and participation in pricing programs.

Level 1 - Evaluating

1. Are customer experience requirements defined? (N)
   - No
   - Yes, designed but not implemented
   - Yes, partially implemented
   - Yes, fully implemented
   - Yes, fully implemented and reviewed and updated periodically 8 Market Innovation This domain provides the capabilities for the organization to adapt to changing markets, business models, and customer needs. It covers innovation, customer partnering, and development of ecosystems that provide new products and services to emerging societal needs.

Level 1 - Evaluating

1. Are research and innovation performed to enhance traditional energy sales (product and service offerings)? (N)
   - No
   - Yes
   - Aligned with key stakeholders for critical products and services
   - Aligned with key stakeholders for all products and services, and programs
   - Aligned with all stakeholders Level 5 - Leading 1. Are dynamic energy transactions enabled through energy tokenization? (N)
   - No
   - Somewhat
   - To a great extent
   - Comprehensively

FIG. 6F

DYNAMIC MATURITY MODEL

BACKGROUND

Embodiments herein relate to maturity models and more specifically to dynamic maturity models.

A maturity assessment evaluates the attributes of an organization's processes to determine the process' ability to consistently and continuously contribute to achieving organizational objectives. Processes with a high ability of contributing to these objectives are considered mature. When conducting a maturity assessment, factors evaluated include, but are not limited to, data governance, data capabilities, data availability, and/or data use and impact. Open innovation promotes a mindset counter to the secrecy and silo mentality of traditional corporate research labs. In open business models, collaboration with partners in the ecosystem becomes a central source of value creation. Companies pursuing an open business model actively search for novel ways of working together with suppliers, customers, or complementors to open and extend their business. As organizations accelerate their digital transformation initiatives and fundamentally change the way they operate, the changes can be characterized by an increased collaboration at an ecosystem level and the use of more open business models. The use of collaboration and models has affected business processes executed by organizations, including but not limited to, how they innovate, bring new ideas to market, and generate value. Because changes occur over time, it is difficult to understand, at any given time, the open innovation maturity and performance of the processes.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user.

In another aspect, a computer program product can be provided. The computer program product can include a computer readable storage medium readable by one or more processing circuit and storing instructions for execution by one or more processor for performing a method. The method can include, for example processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user.

In a further aspect, a system can be provided. The system can include, for example a memory. In addition, the system can include one or more processor in communication with the memory. Further, the system can include program instructions executable by the one or more processor via the memory to perform a method. The method can include, for example: processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A-6G depict a text based survey maturity model document generated from a maturity model specification text based document, according to one embodiment;

DETAILED DESCRIPTION

Figure 1:
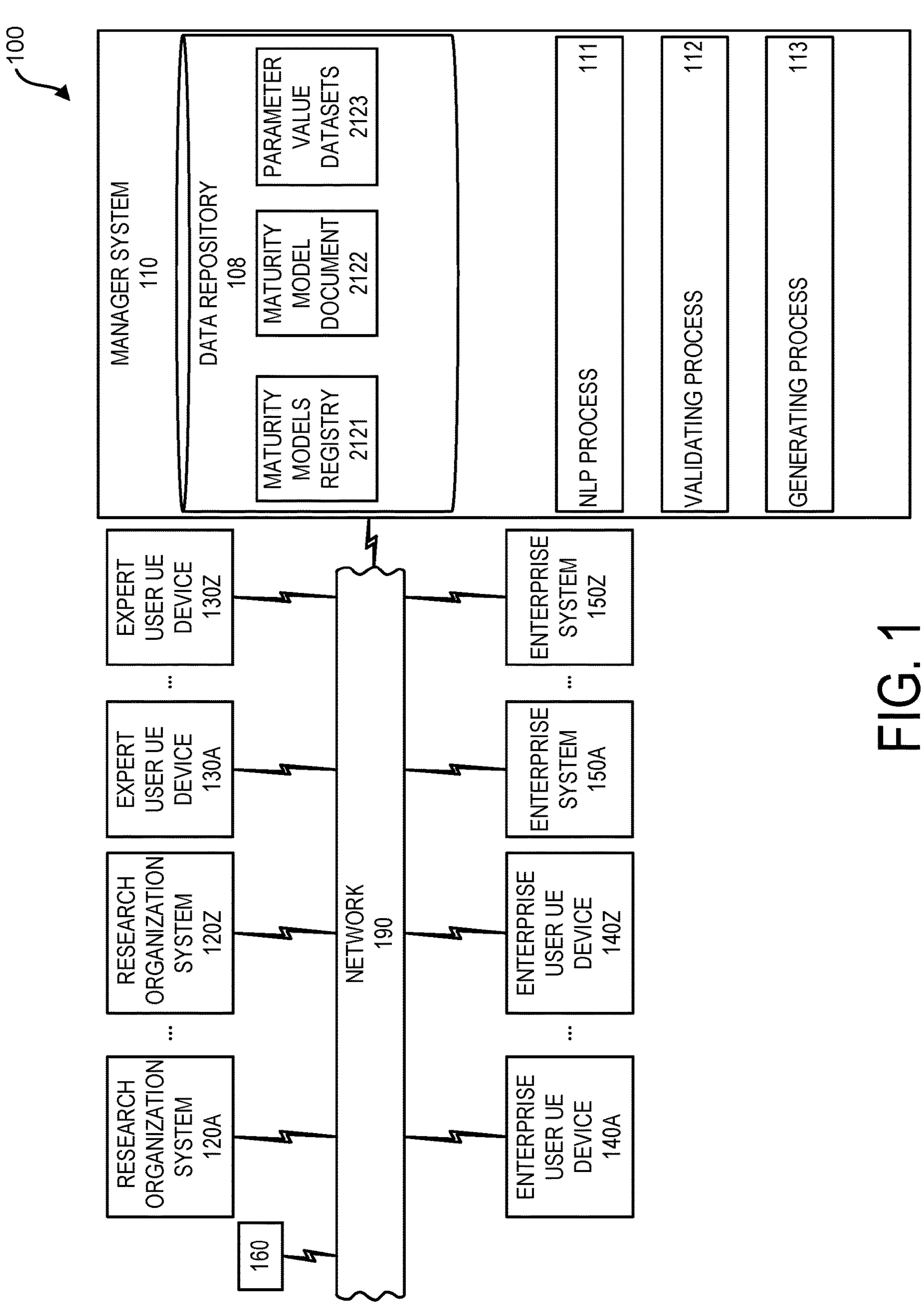
FIG. 1 depicts a system having a manager system, research organization systems, and enterprise systems according to one embodiment.

System 100 for use in advancing maturity of enterprises with respect to an industry mission is shown in FIG. 1. System 100 can include manager system 110 having data repository 108, research organization systems 120A-120Z, core group expert user equipment (UE) devices 130A-130Z, enterprise user UE devices 140A-140Z, enterprise systems 150A-150Z, and other system(s) in communication via network 190. System 100 can include numerous devices which can be computing node based devices connected by network 190. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network. "Z" herein, as referenced in connection with research organization systems 120A-120Z, core group expert user UE devices 130A-130Z, enterprise user UE devices 140A-140Z, and enterprise systems 150A-150Z can refer to any integer value.

Embodiments herein can guide updating of maturity models so that over time maturity models are optimized for purposes of advancing maturity of enterprises. A maturity model herein can refer to a specification that specifies a set of domains and for each respective domain of the maturity model capabilities that are associated to different respective maturity levels of the domain. That is, for a given domain of the maturity model for a certain industry mission, the domain can include a set of different maturity levels, e.g., level 1, level 2, level 3, level 4, and level 5. The respective ones of the maturity levels can include respective associated capabilities. When an enterprise exhibits the capabilities associated to a certain level within a domain, the enterprise can be designated as having achieved the maturity level, e.g., a certain level of between level 1 and level 5 associated with that capability. In a clean electrification maturity model example, domains can include, e.g., (1) strategy and leadership, (2) organization and culture, (3) technology, (4) sustainability, (5) grid operations, (6) work and assessment management, (7) customer experience, and (8) market innovation. Domains can be designed to be non-overlapping in terms of subject matter. Embodiments herein can provide features so that prospective new domains can be automatically detected as time proceeds. On the detection of a potential new domain, manager system 110 can automatically generate prompting data, e.g., prompting data for prompting the defining of a new domain. Prompting data as set forth herein can include prompting data for prompting action by a user such a core group expert user or another user. Prompting data, as set forth herein, can be sent to a UE device such as a UE device of UE devices 130A-130Z for presentment on a displayed user interface of the UE device.

Embodiments herein recognize that, in use, a maturity model can assist enterprises in advancing its own maturity in respect to an industry mission associated to a maturity model. Example industry missions can include, e.g., clean electrification, transportation congestion management, waste removal for municipality, and cyber security, etc.

Embodiments herein recognize that existing maturity models can be overly reliant on human decisions, which can be susceptible to bias and error. Embodiments herein can include various features that guide and assist, e.g., with use of user interface prompts, expert users in the generation of maturity models. Embodiments herein recognize that existing maturity models are inherently prone to subjective and biased determinations (e.g., influenced by emotion, personal preference, intuition, etc.) from core expert users who define inputs to maturity models. Embodiments herein replace subjective determinations with objective determinations, and in dependence on text based processing can guide the development of objectively defined maturity models with use of real-time generated prompting data (e.g., without substantive user-perceivable delay) that can be presented to users, including core group expert users. Processing of text based data in various aspects set forth herein can detect trends incapable of being detected by humans, such as trends involving generationally emerging topics indicating the presence of new domains and generationally emerging topics indicating the presence of new capabilities within new domains. Embodiments herein can include features so that progression of a maturity model through generations is not dependent on human analysis and intervention. Rather, embodiments herein can detect latent trends incapable of being practically perceived by humans, and based on such detected latent trends can automatically prompt for the establishing of a new domain and/or capability associated to a new domain.

In one aspect, embodiments herein can provide for guided generation of a succession of maturity models for a given industry mission. In one aspect, system 100 can guide the development of multiple generations of maturity models within an industry mission, e.g., first generation, second generation, third generation (Gen 1, Gen 2, Gen 3) and so on. In one aspect, system 100 can employ natural language processing (NLP) to digest model documentation in performance of guiding the generation of multiple generations of maturity model for a given industry mission in a manner that can reduce the impact of human error and human bias in the model generation.

In maturity model registry area 2121, data repository 108 can store data that identifies for a given maturity model generations of the maturity model. Data repository 108 in maturity model registry 2121 for each respective maturity model provided can specify an identifier of an industry mission for a maturity model respective to a certain industry mission and the generation of the maturity model, e.g., Gen 1, Gen 2, Gen 3 and so on. A maturity model of system 100 can be uniquely identified by industry mission and generation.

In one aspect, each respective generation of a maturity model for a given industry mission can include one or more document which can be stored in maturity model documents area 2122. A maturity model document can be provided by a text based document. The documents for a given maturity model of the certain generation can be, e.g., a source document which can be processed for development of the maturity model or can be a production document which specifies domains and/or capabilities associated to a maturity level within a domain.

One example of a maturity model document is a text based maturity model specification document which can specify a definition for a maturity model. A maturity model specification domain can specify, e.g., the domains of a maturity model, definitions for the domains, capabilities associated to the domains, definitions for the domains, and maturity levels (e.g., level 1, level 2, level 3, level 4, level 5) for the various capabilities. One example of a maturity model production document text is a text based maturity model survey. Manager system 110 can be configured to automatically generate a maturity model survey based on a maturity model specification document, e.g., can automatically format text content of a maturity model specification document into survey question format. Thus, a maturity model survey can include content similar to content of a maturity model document with formatting to present definitional content into question form. A maturity model survey can specify various domains within an industry mission, and capabilities referenced to various different maturity levels of each respective domain. When a maturity model has been determined including determined domains and capabilities associated to the domains in various maturity levels, a survey can be released to enterprises. Survey questions can be presented to enterprises for the purpose of assisting the enterprises in determining their maturity level across domains within an industry. An example of a text based maturity model survey is presented in FIGS. 6A-6G. In one aspect, in addition to including various multiple choice question sections as shown, the survey can include one or more variable data input text area 6102 which permits an enterprise agent user to input variable data text to define survey response data in response to prompting data 6101 of the survey which prompts for entry of the variable data defined by input text data of an administrator user. The one or more variable data input text area 6102 can be prefaced prior to domain specific sections of the survey and/or can be interspersed within the various domain specific sections of the survey.

On release of a survey, enterprises can present survey response data. In one aspect, manager system 110 can process survey response data for assessment of a maturity level of an enterprise. In another aspect, manager system 110 can apply and process survey response data of a given enterprise as a source document of a next generation maturity model.

Data repository 108 in maturity model parameter values area 2123 can include parameter value datasets associated to respective maturity model documents. In use, manager system 110 can digest various documents, e.g., source documents and/or production documents associated to a maturity model having a maturity model identifier and generation identifier. The digesting of a document can include subjecting the text based document to natural language processing (NLP) for purposes of producing NLP output parameter values of the document. Example NLP output parameters can include, e.g., topics, sentiments including sentiments associated to topics, keywords, categories, classifications, concepts, emotions, entities, metadata, relations, semantic roles, and the like. Within maturity model parameter values area 2123, parameter value datasets can be tagged with identifiers that identify, e.g., the associated maturity model type and generation and maturity model document which was subject to natural language processing for producing the parameter value dataset. Manager system 110 can run various processes.

Manager system 110 running a natural language processing (NLP) process 111 can include manager system 110 processing the text based document for production of one or more NLP output parameter. The one or more NLP output parameter can include, e.g., topics, sentiments including sentiments associated to topics, keywords, categories, classifications, concepts, emotions, entities, metadata, relations, semantic roles, and the like. Manager system 110 can run natural language processing (NLP) process 111 for determining one or more NLP output parameter of a message. NLP process 113 can include one or more of a topic classification process that determines topics of messages and outputs one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters, e.g., one of more "social tendency" NLP output parameter or one or more "writing style" NLP output parameter. By running of NLP process 111, manager system 110 can perform a number of processes including one or more of (a) topic classification and output of one or more topic NLP output parameter for a received message, (b) sentiment classification and output of one or more sentiment NLP output parameter for a received message, or (c) other NLP classifications and output of one or more other NLP output parameter for the received message. Topic analysis for topic classification and output of NLP output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Manager system 110 running NLP process 113 can include manager system 110 returning NLP output parameters in addition to those specification topics and sentiments, e.g., can provide sentence segmentation tags, and part of speech tags, keywords, categories, classifications, concepts, emotions, entities, metadata, relations, semantic roles, and the like. Manager system 110 can use sentence segmentation parameters to determine e.g., that an action topic and an entity topic are referenced in a common sentence, for example.

Manager system 110 running validating process 112 can include manager system 110 validating a current maturity model of a current generation, e.g., based on processing of provisional maturity model that has been generated in dependence on input by one or more core group expert user. Manager system 110 running validating process 112 can include manager system 110 comparing a parameter value dataset associated to a current generation of a current model to a parameter value dataset associated to a prior generation maturity model of the current maturity model. Manager system 110 for providing a parameter value dataset of a maturity model can subject one or more text based document (source and/or production) of the maturity model to natural language processing for producing natural language processing output parameter values defining the parameter value dataset. Processing of a text based document for generating natural language processing parameter values can include, e.g., performing sentence segmentation, word tokenization, stemming, lemmatization, stop word analysis, dependency parsing, and/or part of speech tagging.

Comparison of parameter value datasets can include establishing of and use of machine learning predictive models, e.g., trained regression-based predictive models or trained machine learning models of another machine learning technology. Manager system 110 running generating process 113 can include manager system 110 generating prompting data. For prompting a core group expert user, the prompting data can prompt a core group expert user to define model defining inputs in dependence on a result of manager system 110 comparing a parameter value dataset of the current generation of the current model relative to a parameter dataset of one or more prior generation model of a current maturity model.

Figure 2A:
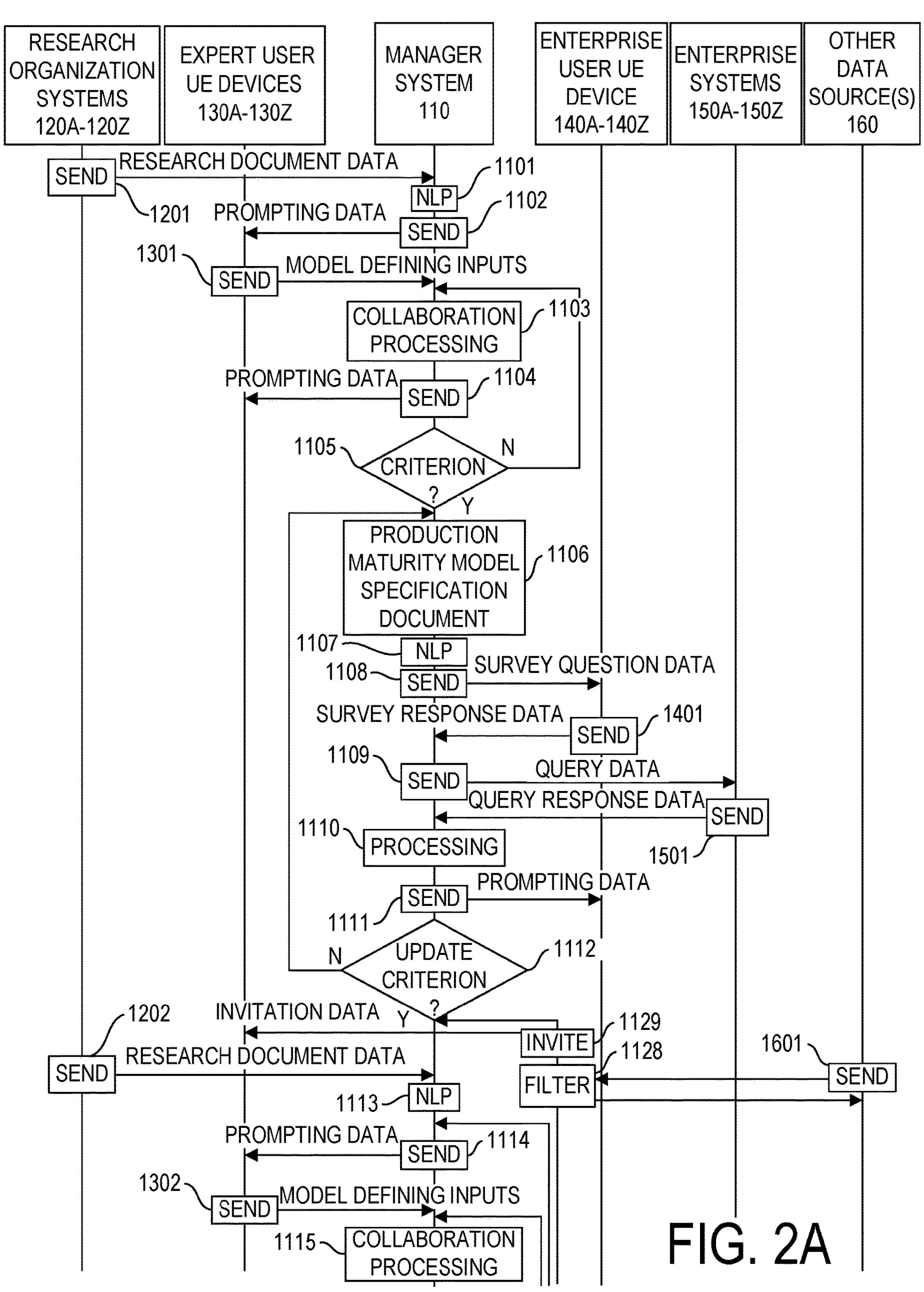
FIGS. 2A-2B is a flowchart illustrating a method for performance by a manager system according to one embodiment.
Figure 2B:
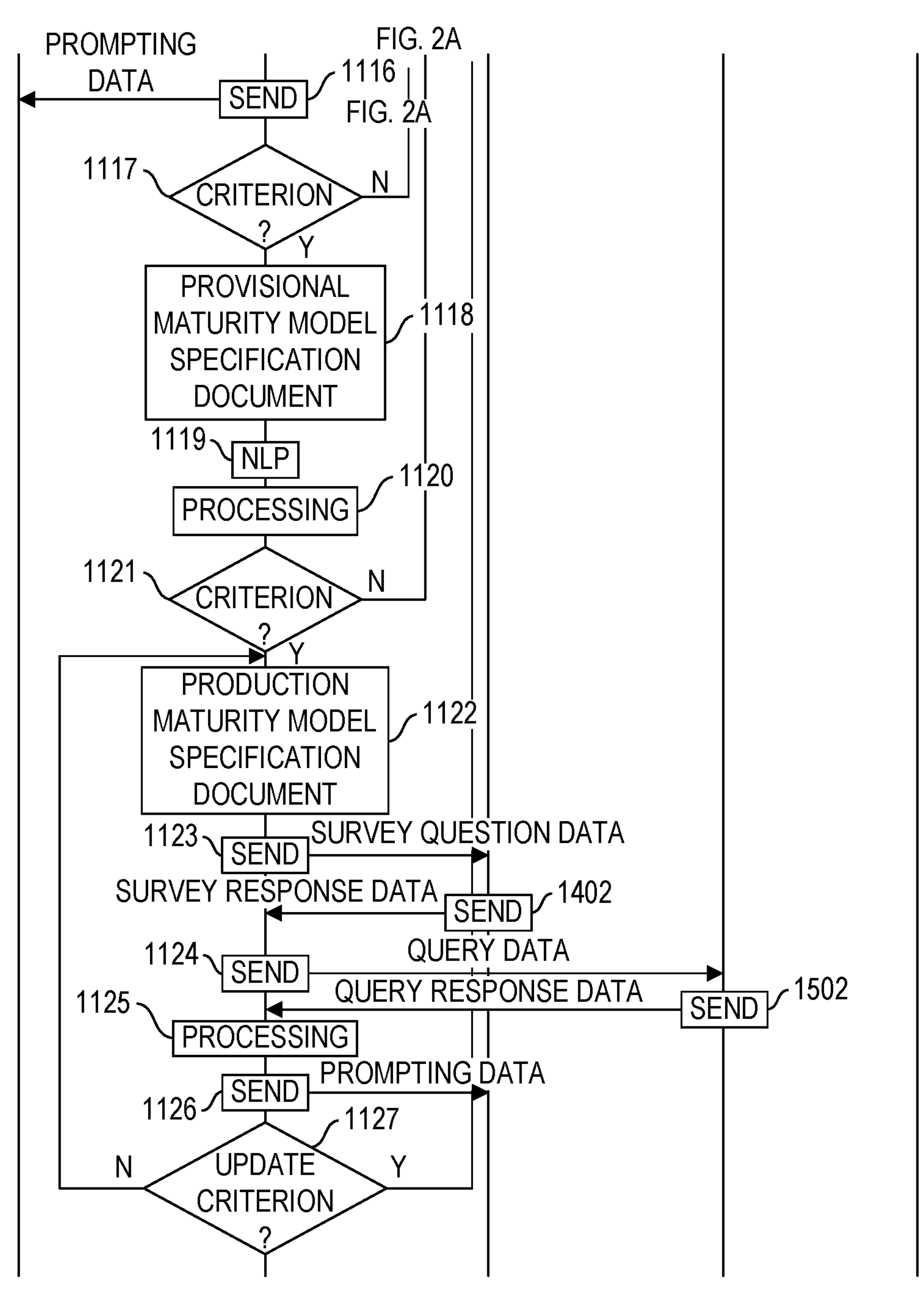

FIG. 2A to 2B is a flowchart illustrating manager system 110 interoperating with research organization systems 120A-120Z, core group expert user UE devices 130A-130Z, enterprise user UE devices 140A-140Z, enterprise systems 150A-150Z, and other system(s) 160. At block 1201, research organization systems 120A-120Z can be sending various research document data for receipt by manager system 110.

Research document data can include, e.g., research document data resulting from, e.g., industry analysis marketplace research, publications (including by academic and/or research institutions), customer feedback and legislative, and/or regulatory feedback. On receipt of the research document data, manager system 110 can store the research document data receipt of the research document data.

Manager system 110 can store the received research document data into maturity model documents area 2122 of data repository 108 and can subject the received research document data to artificial intelligence AI analysis, e.g., with use, the AI analysis performed at block 1101 can include manager system 110 subjecting received documents to natural language processing for extraction of natural language processing output parameter values. NLP output parameters output at block 1101 can include, e.g., listings of topics extracted from documents sent at block 1201.

On completion of block 1101, manager system 110 can proceed to block 1102. At block 1102, manager system 110 can send prompting data for receipt by core group expert users at core group expert user UE devices 130A-130Z. The prompting data can include, e.g., listings of topics resulting from processing of research document data defined by research documents processed at block 1101. In response to receipt of the prompting data sent at block 1102 core group expert users with use of core group expert user UE devices 130A-130Z can define model defining inputs sent at block 1301, which model defining inputs can be sent by core group expert user UE devices 130A-130Z at block 1301 for receipt by manager system 110. Model defining inputs can include, e.g., core group expert user selections for, e.g., domains and capabilities associated to domains. Manager system 110 at block 1103 can perform collaboration processing using one or more collaboration tool.

A collaboration tool facilitating processing at block 1103 can include a collaboration tool that manages responses for multiple users and coordinates conversation between users. In response to processing at block 1103, manager system 110 can proceed to block 1104. At block 1104, manager system 110 can send prompting data in dependence on the collaboration processing performed at block 1103. Prompting data sent at block 1104 can include, e.g., reports specifying differing responses among core group expert users, highlights of topics, highlights of issues to resolve between core group expert users, and the like.

On completion of block 1104, manager system 110 can proceed to block 1105. At block 1105, manager system 110 can ascertain whether a criterion has been satisfied for completion of production of a maturity model specification document. On the determination at block 1105 that the criterion has not been satisfied, manager system 110 can return to a stage proceeding block 1103 and can iteratively perform the loop of blocks 1103 to 1105 until the criterion at block 1105 is satisfied. When the criterion at block 1105 is satisfied, manager system 110 can proceed to block 1106.

At block 1106, manager system 110 can output one or more production maturity model specification document. The maturity model specification document can specify multiple domains defining a maturity model and capabilities associated to each respective domain, as well as capabilities and associated maturity levels for the various domains.

On completion of block 1106, manager system 110 can proceed to NLP block 1107.

At NLP block 1107, manager system 110 can perform natural language processing of the production maturity model specification document output at block 1106. Based on the performance of NLP block 1112, manager system 110 at block 1112 can output a parameter value dataset of NLP output parameters.

NLP output parameters output at block 1112 can include, e.g., identified topics, sentiments including sentiments associated to topics, keywords, categories, classifications, concepts, emotions, entities, metadata, relations, semantic roles, and the like.

On completion of NLP block 1107, manager system 110 can proceed to block 1108. At block 1108, manager system 110 can send survey question data from a completed survey generated based on the production maturity model specification document output at block 1106. At block 1108, manager system 110 can send survey question data. In response, enterprise user UE devices 140A-140Z at block 1401 can send survey response data defining survey response documents.

The survey response data sent at block 1401 can be sent by agent users associated to various enterprises. When a production maturity model specification document is operative at block 1106, the production maturity model specification document can be used to provide maturity accelerating services to various enterprises. With the production maturity model specification document provided at block 1106, manager system 110 can use the document, e.g., to drive survey questions, evaluate defined capabilities specified in the production maturity model specification document, evaluate maturity level of an enterprise across domains based on received survey response data and data from enterprise systems, and the like.

At block 1109, manager system 110 can send query data to enterprise systems 150A-150Z for querying enterprise systems for data indicating achievement of capabilities set forth in various domains of a maturity model. In response to receipt of the query data, enterprise systems 150A-150Z at block 1501 can send query response data for receipt by manager system 110. Manager system 110 at block 1110 can perform processing of received survey response data sent at block 1401 and received query response data sent at block 1502.

Processing at block 1110 can include processing to determine a maturity level of an enterprise across various domains that are expressed in the maturity model specification document output at block 1106. On completion of processing at block 1110, manager system 110 can proceed to block 1111. At block 1110, manager system 110 can send prompting data to enterprise UE devices 140A-140Z associated to various agents of various enterprises. The prompting data sent at block 1110 can specify actions of enterprises that can benefit the attainment of a next maturity level across various domains.

On completion of block 1111, manager system 110 can proceed to update criterion block 1112. Embodiments herein recognize that maturity models can benefit from being updated, e.g., from Gen 1, Gen 2, and so on. Embodiments herein recognize that as time proceeds at block 1111, manager system 110 can ascertain whether an update criterion has been satisfied. In one embodiment, system 100 can be configured so that manager system 110 sets time limits for each generation of a maturity model that is produced, e.g., six months, one year, five years, and the like. In another embodiment, manager system 110 can assess the availability of new research document data that might facilitate meaningful updating of a maturity model. In another embodiment, manager system 110 can determine that update criterion has been satisfied in dependence on a processing of survey response data (which survey response data can define next generation source document data).

Embodiments herein recognize that a maturity model can benefit from being updated over time. For example, as technology advances capabilities previously associated to an advanced level of maturity, e.g., maturity level 5 may become available to an enterprise just entering an industry, and therefore over time a certain capability having an advanced level of maturity, e.g., level 5 may, in the future, become a capability associated, e.g., to level 4, level 3, level 2, or even level 1.

On the determination by manager system 110 at block 1112 that an update criterion has not been satisfied, manager system 110 can loop back to a stage prior to block 1106 and can iteratively perform the loop of blocks 1106 to 1112. Manager system 110 iteratively performing the loop of blocks 1106 can result in manager system 110 send prompting data guiding enterprises to achieve next maturity levels (at iterations of block 1111) until a time that the current generation of maturity level for which documentation is output at block 1106 becomes subject to updating by a determination at block 1112.

At block 1113, manager system 110 can perform artificial intelligence processing including natural language processing of received research document data sent by research organization systems 120A-120Z at block 1202. Research document data sent at block 1202 can include updated research document data similar to research document data sent at block 1201 but updated with respect to research document data sent at block 1201.

AI processing at block 1113 can include, e.g., natural language processing to provide NLP output parameter values such as topics. AI analysis performed at block 1113 can include manager system 110 subjecting received documents to natural language processing for extraction of natural language processing output parameter values. NLP output parameters output at block 1113 can include, e.g., listings of topics extracted from documents sent at block 1202.

On completion of block 1113, manager system 110 can proceed to block 1114. At block 1114, manager system 110 can send prompting data for receipt by core group expert users at core group expert user UE devices 130A-130Z. The prompting data can include, e.g., listings of topics resulting from processing of research document data processed at block 1113. In response to receipt of the prompting data sent at block 1114, core group expert users with use of core group expert user UE devices 130A-130Z can define model defining inputs sent at block 1302, which model defining inputs can be sent by core group expert user UE devices 130A-130Z at block 1302 for receipt by manager system 110. Model defining inputs can include, e.g., core group expert user selections for, e.g., domains and capabilities associated to domains. Manager system 110 at block 1115 can perform collaboration processing using one or more collaboration tool.

A collaboration tool facilitating processing at block 1115 can include a collaboration tool that manages responses for multiple users and coordinates conversation between users. In response to processing at block 1115, manager system 110 can proceed to send block 1116. At send block 1116, manager system 110 can send prompting data in dependence on the collaboration processing performed at block 1115. Prompting data sent at block 1116 can include, e.g., reports specifying differing responses among core group expert users, highlights of topics, highlights of issues to resolve between core group expert users, and the like.

On completion of block 1116, manager system 110 can proceed to block 1117. At block 1117, manager system 110 can ascertain whether a criterion has been satisfied for completion of a production maturity model specification document. On the determination at block 1117 that the criterion has not been satisfied, manager system 110 can return to a stage proceeding block 1114 and can iteratively perform the loop of blocks 1114-1117 until the criterion at block 1117, is satisfied. When the criterion at block 1117 is satisfied, manager system 110 can proceed to block 1118.

On the determination that the criterion has been satisfied at block 1117, manager system 110 can proceed to block 1118. At block 1118, manager system 110 can output a provisional maturity model specification document. The provisional maturity model specification document output at block 1118 can be an output provisional maturity model specification document that is output based on maturity model defining inputs of multiple core group expert users and can have the elements of a production maturity model specification document, e.g., can include specified domains characterizing an industry mission, and for each respective domain, capabilities associated to specified maturity levels.

On completion of block 1118, manager system 110 can proceed to NLP block 1119. At NLP block 1119, manager system 110 can subject the provisional maturity model specification document output at block 1118 to natural language processing in order to output a parameter value dataset associated to the provisional maturity model specification document output at block 1118. The parameter value dataset at block 1119 can include parameter values extracted from the performed natural language processing of the provisional maturity model specification document output at block 1118. The parameter value dataset output at block 1119 can include, e.g., topics, sentiments including sentiments associated to topics, keywords, categories, classifications, concepts, emotions, entities, metadata, relations, semantic roles, and the like.

On completion of NLP block 1119, manager system 110 can proceed to block 1120. At block 1120, manager system 110 can perform processing of an NLP parameter value dataset output at block 1119 with reference to the NLP output parameter value dataset output at block 1112. The processing at block 1120 can include comparing NLP output parameter value datasets, wherein a first of the compared NLP output parameter datasets is a parameter value dataset associated to the initial, i.e., Gen 1 model for which a production maturity model specification document is output at block 1106 and wherein a second of the compared NLP output parameter datasets is a parameter value dataset associated to a second generation maturity model for which a production maturity specification document can be output at block 1118.

The processing at block 1120 can include processing to determine whether the provisional maturity model specification document output at block 1118 is valid or disqualified. The processing at 1120 can include processing to ascertain whether the provisional maturity model specification document output at block 1118 is disqualified based on a determination that the provisional maturity model specification document can be improved according to an improvement criterion.

On completion of block 1120, manager system 110 can proceed to criterion block 1121. At block 1121, manager system 110 can ascertain whether the provisional maturity model specification document output at block 1118 is valid and is not subject to improvement. On the determination at block 1121 by manager system 110 that the provisional maturity model specification document output at block 1118 is valid and not subject to improvement per a specified criterion, manager system 110 can proceed to block 1122.

At block 1122, manager system 110 can output the provisional maturity model specification document output in the last iteration of block 1118 as a production maturity model specification document. It will be noted that when manager system 110 registers a provisional maturity model specification document as a production maturity model specification document at block 1122, the output NLP parameter value dataset output at block 1119 becomes the parameter value dataset associated to the production maturity model specification document output at block 1122.

On the determination at block 1121 that the one or more criterion has not been satisfied, manager system 110 can return to a stage prior to block 1114, and at block 1114 can send next prompting data to core expert users at the respective core group expert user UE devices 130A-130Z. The prompting data can include prompting data to define new model defining inputs in dependence on processing that was performed during the last iteration of processing block 1120.

The prompting data sent at the described iteration of block 1114 subsequent to block 1121 can include prompting data, e.g., to address errors identified at block 1114 and can, in another aspect, include prompting data to prompt core group expert users to improve the current generation of a model based on processing performed at block 1120.

On completion of block 1122, manager system 110 can proceed to block 1123. At block 1123, manager system 110 can send survey question data. At block 1123, manager system 110 can send survey question data from a completed survey document output at block 1123.

At block 1123, manager system 110 can send survey question data. In response, enterprise user UE devices 140A-140Z at block 1402 can send survey response data.

The survey response data sent at block 1402 can be sent by agent users associated to various enterprises. When the production maturity model specification document is operative block 1122, the production maturity model specification document can be used to provide maturity accelerating services to various enterprises.

With the production maturity model specification document provided at block 1122, manager system 110 can use the document, e.g., to drive survey questions, evaluate and define capabilities specified in the production maturity model specification document, evaluate maturity level of an enterprise across domains based on received survey response data and data from enterprise systems, and the like.

At block 1124, manager system 110 can send query data to enterprise systems 150A-150Z for querying enterprise systems for data indicating achievement of capabilities set forth in various domains of a maturity model. In response to receipt of the query data, enterprise systems 150A-150Z at block 1502 can send query response data for receipt by manager system 110. Manager system 110 at block 1125 can perform processing of received survey response data sent at block 1402 and received query response data sent at block 1502.

Processing at block 1125 can include processing to determine a maturity level of an enterprise across various domains that are expressed in the maturity model specification document output at block 1122. On completion of processing at block 1125, manager system 110 can proceed to block 1126. At block 1126, manager system 110 can send prompting data to enterprise UE devices 140A-140Z associated to various agents of various enterprises. The prompting data sent at block 1110 can specify actions of enterprises that can benefit the attainment of a next maturity level across various domains.

On completion of block 1110, manager system 110 can proceed to update criterion block 1127. Embodiments herein recognize that maturity models can benefit from being updated, e.g., from Gen 1 to Gen 2 and so on. Embodiments herein recognize that as time proceeds at block 1111, manager system 110 can ascertain whether an update criterion has been satisfied. In one embodiment, system 100 can be configured so that manager system 110 sets time limits for each generation of a maturity model that is produced, e.g., six months, one year, five years, and the like. In another embodiment, manager system 110 can assess the availability of new research document data that might facilitate meaningful updating of a maturity model. In another embodiment, manager system 110 can assess survey response data for determining whether an update criterion has been satisfied.

Where an update criterion has not been satisfied, manager system 110 can return to a stage prior to block 1122 and can iteratively perform the processing blocks 1122 to 1127 until an update criterion has been satisfied. At blocks 1122 to block 1127, the production maturity model specification document output at block 1122 can be used by manager system 110 to provide maturity accelerating services to various enterprises.

On the determination by manager system 110 at block 1127 that an update criterion has been satisfied, manager system 110 can return to a stage prior to block 1113 to receive a next iteration of research document data for research organization systems 120A-120Z at block 1202. Embodiments herein recognize that where manager system 110 produces NLP output parameter value datasets for multiple generations of a particular maturity model, manager system 110 can perform trends processing to ascertain transferring between generations of a maturity model.

On completion of block 1126, manager system 110 can proceed to block 1127. At block 1127, manager system 110 can ascertain whether an update criterion has been satisfied. On the determination at block 1127 that an update criterion has not been satisfied, manager system 110 can loop back to a stage prior to block 1122 and can iteratively perform the blocks 1122 until an update criterion has been satisfied. When manager system 110 ascertains at block 1127 that an update criterion has been satisfied, manager system 110 can return to a stage prior to block 1113 to receive next research document data from research organization systems 120A-120Z.

Embodiments herein recognize that when manager system 110 collects parameter value datasets from NLP processing of text based documents associated to multiple generations of a maturity model, manager system 110 can be capable of performing trends processing in which manager system 110 can predict future characteristics of a maturity model based on trends observed in collections of historical maturity models of prior generations of the certain historical maturity model.

In one embodiment, manager system 110 can be configured to iteratively, e.g., periodically invite new core group expert users into a core group of expert users. Embodiments herein recognize that system 100 can benefit from a regular influx of new voices and new ideas. While many options exist for iteratively inviting new core group expert users, one option is set forth with reference to the flowchart of FIG. 2A-2B.

In one embodiment, manager system 110 at block 1128 can filter candidate core group expert users and at block 1129 manager system 110 can invite qualified core group expert users who have passed a filtering check.

Figure 4:
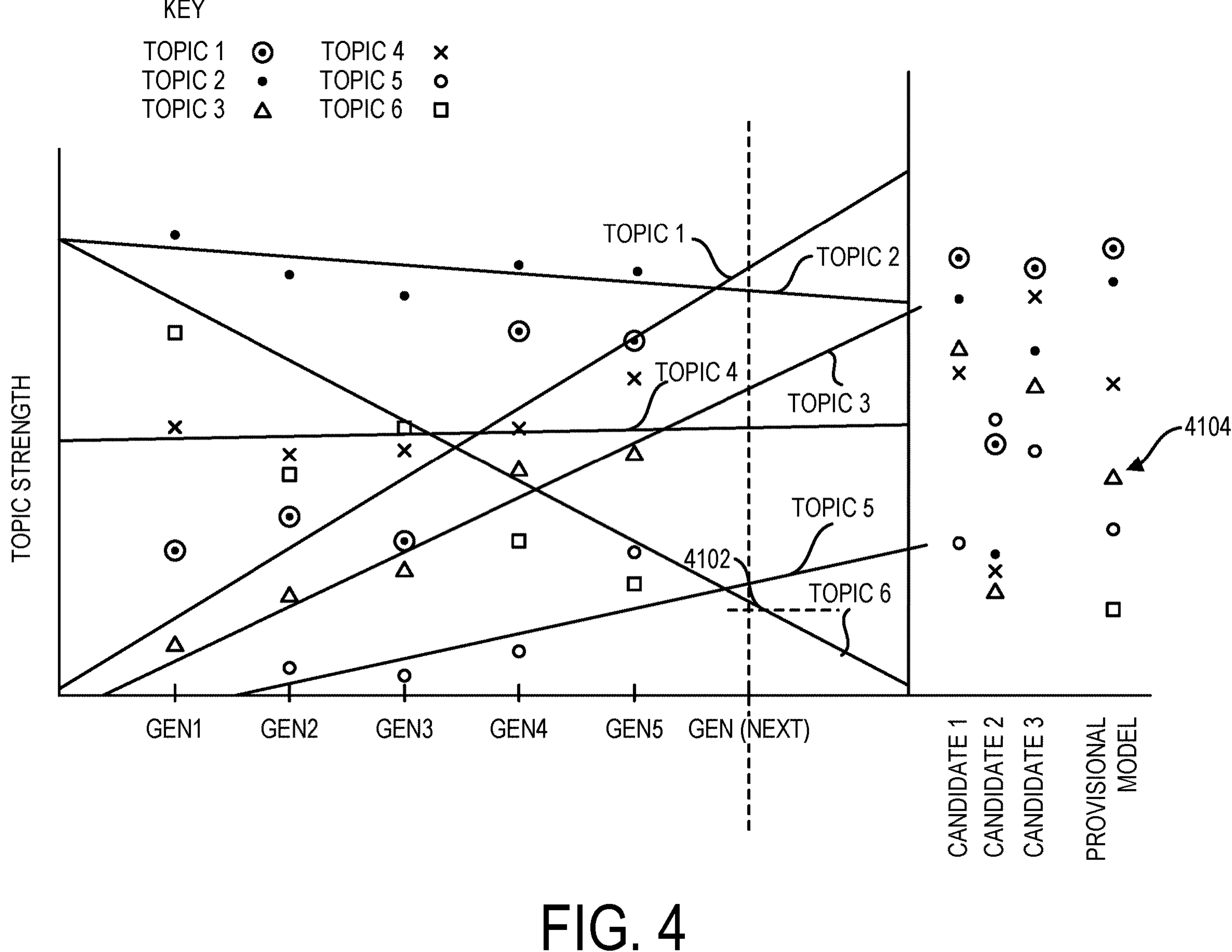
FIG. 4 depicts natural language processing derived parameter value datasets associated to multiple generations of a maturity model and a machine learning predictive model trained by historical generational maturity model datasets, according to one embodiment.

For performing filtering of candidate core group expert users, manager system 110 can employ trends processing as is explained with reference to FIG. 4. FIG. 4 illustrates a topic profile for a maturity model across multiple generations, Gen 1, Gen 2, Gen 3, Gen 4, and Gen 5. FIG. 4 also illustrates regression-based machine learning and predictive analytics.

Topic strengths for first through sixth topics are plotted in FIG. 4. Topic strength illustrated in FIG. 4 defines a topic profile for a maturity model across a set of sequential generations, i.e., Gen 1, Gen 2, Gen 3, Gen 4, Gen 5. In the illustrated topic profile, topics 2 and 4 are relatively stable topics having substantially constant strengths over time. Topic 1 and topic 3 are topics having increasing strengths over time. Topic 5 is a topic having an increasing strength over time that is predicted to rise above a topic strength threshold at a next time period, and topic 6 is a topic having decreasing strength over time that is predicted to fall below a topic strength threshold at a next time period.

Manager system 110 can derive topic strength parameter values defining a parameter value dataset according to a variety of different methods. Manager system 110 when processing a text based document, can identify a certain topic multiple times within a text based document based on terms (e.g., words) of the text based document. Manager system 110 can specify topic strength in dependence on a number of identifications of the topic per unit of words within the document (e.g., topic recognized N times per 100 words). For recognition of topics, training datasets can be applied to a machine learning model, wherein training datasets can include terms specified by an administrator user associated to predetermined topics specified by the administrator user. In one aspect, terms can be graded based on the strength of their association to a predetermined topic, and manager system 110 can adjust assigned topic strengths to documents based on the described term strength. Recognition of a certain topic within a text based document can be based on terms identified within the document associated to the terms, the term frequency of such terms, and/or term strength. The term frequency parameter value can be a raw term frequency parameter value and/or can be an adjusted term frequency parameter value provided by a term frequency inverse document frequency (TF-IDF) parameter value. In the identification of topic strengths, manager system 110 can employ word2vec processing, e.g., for expansion of training datasets so that additional terms are productively recognized and processed by manager system 110.

In one embodiment, topic strength parameter values can be applied to a machine learning model for training of the machine learning and then the machine learning model, once trained, can be queried to return predictions as to subsequent topic strength in a subsequent generation maturity model. In the illustrated example of FIG. 4, a regression-based machine learning model is illustrated for predicting topic strength for multiple topics across generations of maturity models.

Figure 3A:
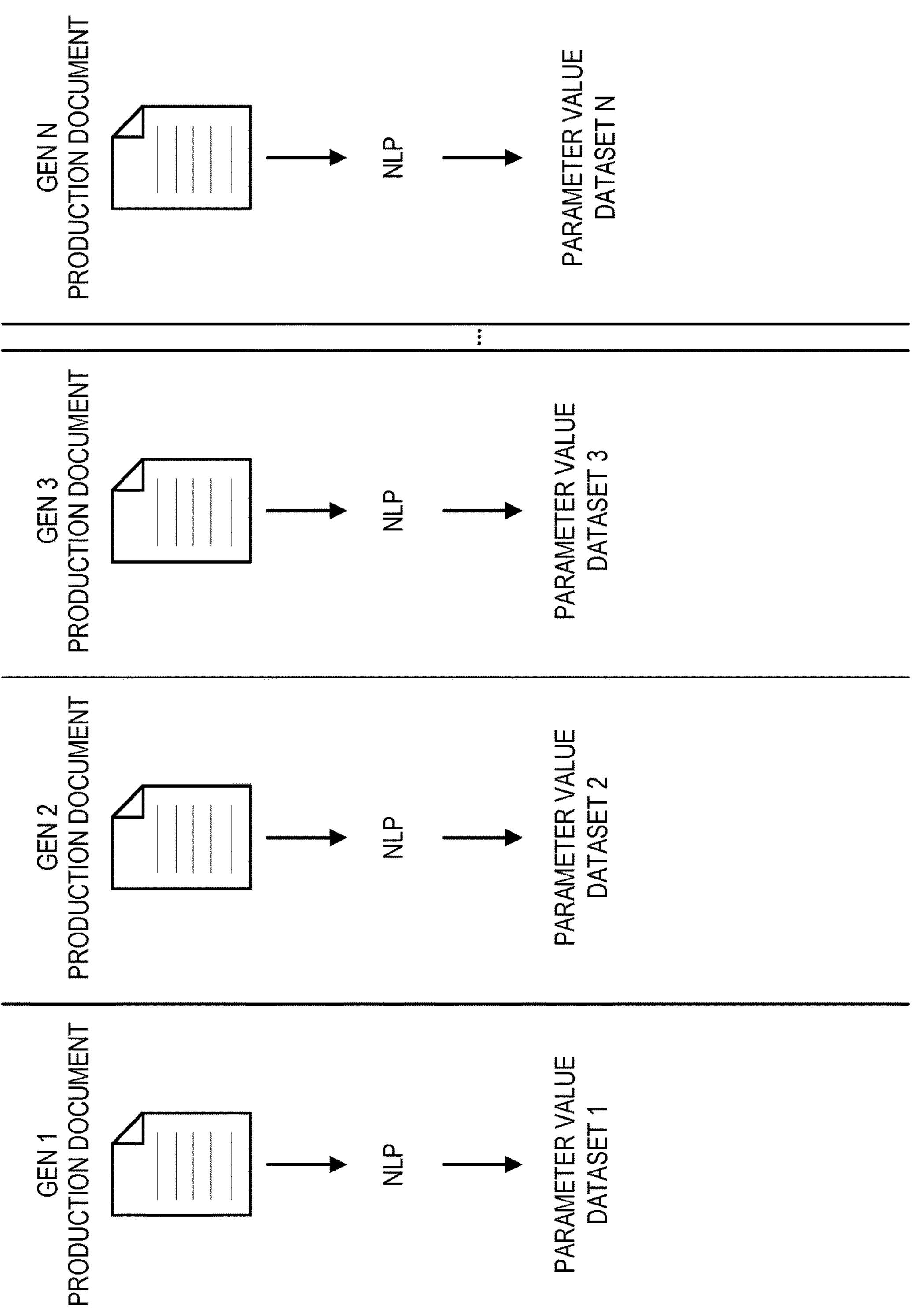
FIGS. 3A and 3B are diagrams illustrating features according to one embodiment.

Regression lines are illustrated in the example of FIG. 4. The regression lines for topics 1, 3, and 5 have a positive slope and the regression lines for topics 2, 4, and 6 have negative slopes. For each subsequent generation of a maturity model, and for each iteration of NLP block 1113 and/or 1119, manager system 110 can apply an extracted natural language processing parameter value dataset for training the predictive model. Machine learning models can be employed based on training using natural language processing parameter value datasets. Referring to FIG. 4, the set of parameter values at the times Gen 1, Gen 2, Gen 3, Gen 4, and Gen 5 represent and define parameter value datasets for each subsequent generation of a maturity model for a given industry mission, e.g., clean electrification, congestion management, waste removal for municipality, cyber security, etc. While seven parameter values provided by topic parameter values are shown (specifically topic strength), manager system 110 in practice can generate parameter values using natural language processing having, e.g., tens, hundreds, thousands, or millions of parameter values, and the parameter values can include parameter values involving, e.g., topics, sentiments including sentiments associated to topics, keywords, categories, classifications, concepts, emotions, entities, metadata, relations, semantic roles, and the like. Manager system 110 can generate parameter value datasets revealing latent properties of text based documents beyond human capacity to track for presentment in real time of prompting data prompting a user to take action. Manager system for generating a parameter value dataset for a certain generation of a maturity model can subject one or more text based document to natural language processing. In one embodiment, manager system 110 can subject just a maturity model specification document to natural language processing for providing of a generation specific maturity model dataset for a certain generation as is indicated in FIG. 3A. In one embodiment, manager system 110 can subject multiple maturity model documents to natural language processing for providing of a generation specific maturity model dataset for a certain generation, e.g., multiple source maturity model specification documents, multiple production maturity model specification documents, or a combination of source and production maturity model documents, as indicated in FIG. 3A. When providing a parameter value dataset resulting from processing multiple maturity model documents, manager system 110 can aggregate, e.g., average datasets derived from respective ones of the multiple maturity model documents. Manager system 110 in another aspect need not process the same type of document between generations for providing of a parameter value dataset. For example, the parameter value datasets for Gen 1, Gen 2, Gen 3, and Gen 4 can be extracted by processing of maturity model specification documents, and the parameter value dataset for Gen 6 can be extracted by processing of a source document, such as a survey response document and/or a research document.

The regression-based machine learning predictive model depicted in FIG. 4 can be employed in the filtering of candidate core group expert users. Referring to filtering of candidate core group expert users, manager system 110 can filter candidate core group expert users at block 1128 and can invite qualified new invitees at block 1129 (FIG. 2A-2B).

At filter block 1128, manager system 110 can query various other data source(s) 160, e.g., social media data sources and publication libraries for return of text based documents associated to a candidate core group expert user, the other data source(s) at send block 1601 can responsively send one or more text based document associated to one or more candidate core group expert user. At filtering block 1128, manager system 110 can alternatively or additionally query research organization systems 120A-120Z for return of text based documents associated to one or more candidate core group expert users. At filtering block 1128, manager system 110 can subject returned text based documents associated to core group expert users in order to build topic profiles for the users across various topics. A topic profile for the user can specify topic strength for a user across multiple topics. In FIG. 4, there are shown extracted topic profiles for various candidate core group expert users, candidate 1, candidate 2, and candidate 3. At filtering block 1128, manager system 110 can subject documents associated to candidate core group expert users received from data sources 160 and/or research organization systems 120A-120Z using natural language processing to extract natural language processing parameter value dataset which can include such parameters as, e.g., topics, sentiments including sentiments associated to topics, keywords, categories, classifications, concepts, emotions, entities, metadata, relations, semantic roles, and the like.

The provided parameter value datasets can, in one aspect, define topic profile for plurality of candidate core group expert users. Manager system 110 for filtering out and qualifying candidate core group expert users can compare topic profiles built for a plurality of candidate core group expert users to a predicted topic profile (at time Gen(next)) for a maturity model as depicted in FIG. 4. A topic profile derived by manager system 110 for a candidate core group expert user can include aggregate, e.g., average topic strength for candidate core group expert user across a plurality of documents of the candidate core group expert users digested by manager system 110 and subject to natural language processing.

In one aspect, manager system 110 can be configured so that core group expert users are identified based on topics extracted from maturity model text based documents using natural language processing. Referring to FIG. 4, it can be seen that topic 5 is a topic that is increasing in topic strength over generations and that the topic strength for topic 5 at generation (next) is predicted to exceed threshold 4102 in terms of topic strength. Based on topic 5 being predicted to exceed threshold 4102 in a subsequent generation of the current maturity model and in one embodiment further based on the regression line for topic 5 having an increasing slope as shown, manager system 110 can determine that topic five is a topic to be evaluated in identifying and filtering candidate core group expert users.

By contrast with reference to FIG. 4, it can be seen that in a prior iteration of filter block 1128, e.g., the iteration associated with Gen4, manager system 110 may predict the topic strength of topic 5 to be below threshold 4102 and as a result may not have at that time filtered candidate core group expert users based on topics matching with topic 5.

With reference again to the regression machine learning model depicted in FIG. 4, topic 6 is a topic of decreasing topic strength and at the subsequent time period of Gen (next) topic 6 is below threshold 4102. Based on topic 6 being predicted to fall below threshold 4102 and based on the regression line for topic 6 having a negative slope, manager system 110 can determine that topic 6 is to be excluded from filtering criteria in identifying and filtering candidate core group expert users. That is, based on the prediction depicted in FIG. 4, manager system 110 can select a candidate core group expert user for inviting to the core group of expert users, independent of whether a topic profile for the candidate core group expert user matches topic 6 (because topic 6 is predicted to fall below threshold 4102 during the subsequent time period).

It is seen that the criterion for filtering and inviting core group expert users dynamically adapts over time. For example, as new topics are predicted to grow in pertinence, those topics can be automatically established by manager system 110 as part of criterion for vetting new core group expert users. Similarly, as topics are predicted to decline in pertinence those topics no longer may be applied by manager system 110 inviting core group expert users. Manager system 110 can automatically monitor for new terms mapping to topics entering and becoming prominent in the lexicon as presented in source documents such as survey response documents and/or research documents, and/or production documents, such as maturity model specifications in order to reveal latent properties of a lexicon beyond human capacity to practically perceive. Based on the rising or falling of term prominence mapping to topics, manager system 110 can dynamically adjust criterion for qualifying candidate core group expert users and for inviting qualified core group expert users.

Further in reference to FIG. 4, FIG. 4 plots topic profiles of various candidate core group expert users with reference to the predicted topic profile for the next generation of the maturity model. For illustrative purposes, candidate 1 can have a topic profile that is closely matched to the predicted topic profile for the next generation of the maturity model as depicted in FIG. 4. Candidate 2 on the other hand can have a topic profile that is significantly mismatched relative to the predicted topic profile of the generational advancing maturity model. Referring to candidate 3, candidate 3 can have a topic profile that is moderately differentiated from a predicted topic profile for the generationally advancing maturity model.

In the described example of FIG. 4, manager system 110 can reject, disqualify, and filter out candidate 1 based on the difference between a topic profile for the candidate in a predicted topic profile for the maturity model (e.g., determined by summing of per-topic strength differences) being too similar and failing to satisfy and exceed a low threshold of dissimilarity. Embodiments herein, as noted, can endeavor to invite new core group expert users who have diverse and new opinions that are differentiated from opinions of current core group expert users. Accordingly, advantages can accrue by filtering our candidate core group users having topic profiles featuring a threshold satisfying level of similarity with a predicted topic profile for a maturity model in a next generation. Manager system 110 can filter out candidate 1 from the core group of expert users using objectively applied criterion that is applied the same across all users, thus reducing subjectivity, bias, and human error.

Still referring to FIG. 4, manager system 110 can also disqualify, reject, and filter out candidate 2 based on a difference of a topic profile for candidate 2 and a predicted topic profile for the generationally advancing maturity model failing to satisfy and exceeding a high threshold (differences between a topic profile for the candidate user 2 and the predicted topic profile for the maturity model at a subsequent generation can exceed a high threshold). Candidate 2 in the described example of FIG. 4 can be regarded to be a user with opinions conflicting with current trends and sharply differentiated from existing core group expert users. Accordingly, removal of candidate 2 can remove subjectivity and bias. Manager system 110 can filter out candidate 2 from the core group of expert users using objectively applied criterion that is applied the same across all users, thus reducing subjectivity, bias, and human error.

Referring to candidate 3, manager system 110 can qualify candidate 3 as an expert user based on candidate 3 having a topic profile difference relative to predicted topic profile for the generationally advancing maturity model that both satisfies a low threshold and which satisfies a high threshold, i.e., which exhibits a topic profile difference level relative to the predicted topic profile of the current maturity model that exceeds and satisfies the low threshold of differentiation for qualification and is within (under) and therefore satisfies the high threshold for differentiation. Accordingly, the selection of candidate core group expert users permits and encourages the input of a new voice that is differentiated from current voices but at the same time eliminates bias as would occur if candidate 2 were permitted to join the core group of expert users. On qualification of select core group expert users, manager system 110 can advance to block 1129 to invite qualified candidate core group expert users to join the core group of expert users. At block 1129, manager system 110 can send prompting data defined by invitations data to candidate core group expert users who have been qualified as core group expert users. The prompting data sent at block 1129 can prompt the qualified candidate core group expert users to join the group of core group expert users and can include such prompting data as "You have been invited to join the core group of expert users of the [identifier] maturity model." Manager system 110 can qualify candidate 3 for inclusion in the core group of expert users using objectively applied criterion that is applied the same across all users, thus reducing subjectivity, bias, and human error.

Accordingly, there is set forth herein the method comprising processing one or more text based maturity model document of a maturity model, wherein the maturity model specifies a plurality of domains, and for at least one domain of the plurality of domains, capabilities are associated to respective different maturity levels of the at least one domain, wherein the processing of the one or more text based maturity model document includes applying natural language processing to extract from the one or more text based document a parameter value dataset; processing one or more maturity model text document of a second maturity model, wherein the second maturity model specifies a second plurality of domains, and for at least one domain of the plurality of domains, capabilities are associated to respective different maturity levels of the at least one domain, wherein the processing of the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user, wherein the method includes obtaining text based documents associated to candidate core group expert users, subjecting the text based documents to natural language processing to extract natural language processing parameter value datasets associated to respective candidate core group expert users, wherein the method includes selecting invitee core group expert users from the candidate core group expert users in dependence on an emerging topic identified in the second maturity model, wherein identifying the emerging topic has resulted from the comparing the second maturity model to the maturity model, wherein the selecting includes evaluating a topic strength profile of the candidate core group expert users against a predicted topic strength profile of the maturity model in a generation subsequent to the second maturity model, wherein predicting of the topic strength profile of the maturity model in the generation subsequent to the second maturity model has included querying a predictive model that has been trained with training data defined by natural language processing parameter values derived from natural language processing of documents of the maturity model and the second maturity model. In another aspect, the method can include selecting invitee core group expert users from candidate core group expert users, wherein the selecting includes evaluating natural language processing parameter values of the candidate core group expert users against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model.

In another aspect, manager system 110 can be configured to employ trends processing as described in reference to FIG. 4 in order to identify potential new domains for inclusion in a maturity model. At iterations of NLP block 113, manager system 110 can be digesting research documents sent at block 1202. In another aspect, manager system 110 at NLP block 1113 can be digesting most recent survey data received at a prior iteration of send block 1402 (survey response documents associated to survey questions generated based on a prior generation maturity model). At NLP block 1113, manager system 110 can be digesting research document data and/or survey response data, wherein the survey response data has been received at the prior iteration of send block 1402.

At NLP block 1113, manager system 110 can process research documents and/or survey response documents to extract a natural language processing parameter value dataset based on the processed documents. At block 1113, manager system 110 can compare a current natural language processing parameter value dataset to prior natural language processing parameter value dataset associated to a prior generation of the generationally advancing maturity model.

Manager system 110 at block 1113, in one embodiment, can identify potential new domains for inclusion in a generationally advancing maturity model. Processing which can be performed by manager system 110 at block 1113 is described with reference again to FIG. 4 in which natural language processing parameter value dataset data is plotted for various generations, i.e., Gen 1, Gen 2, Gen 3, Gen 4, and Gen 5. In the current example, Gen 5 can represent data of a parameter value dataset extracted from research document data and/or survey response data as explained with reference to NLP block 1113.

Figure 3B:
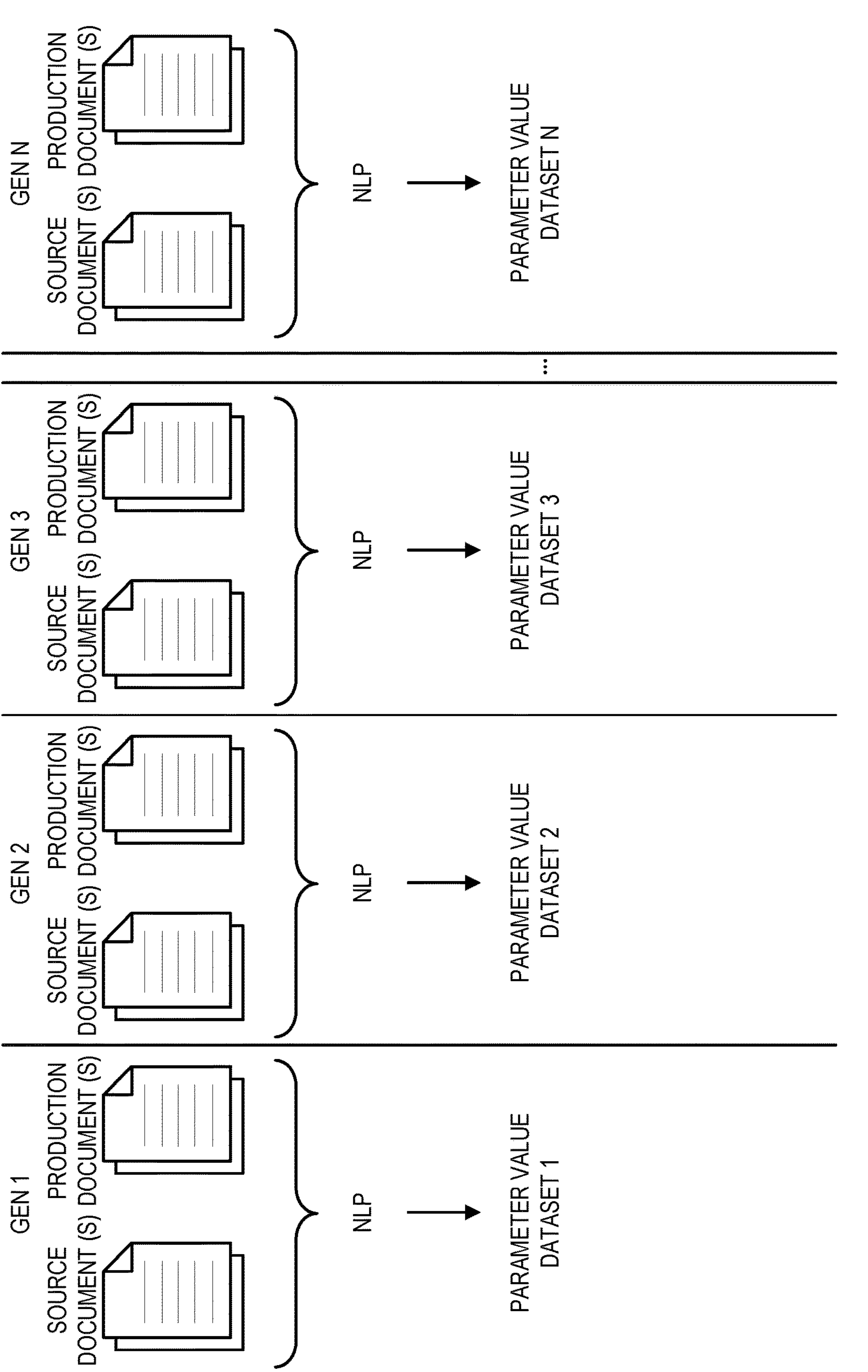

With regression-based machine learning training and predicting as set forth in FIG. 4, manager system 110 can predict future subsequent topic strength values for the various topics depicted, namely topic 1, topic 2, topic 3, topic 4, topic 5, and topic 6 set forth in FIG. 4. In the example described with reference to block 1113, Gen 5 can represent data of the current generation of the generationally advancing maturity model. Source document data applied for production of the parameter values depicted for Gen 5 of FIG. 4 can include updated research documents and survey response documents from the most recent survey questions presented according to most previous generation maturity model. In FIG. 4, the Gen 1 through Gen 4 parameter values can be extracted, e.g., by processing just maturity model specification documents for the prior generations of the maturity model or, for example, can be produced based on processing a combination of source documents and production documents for the respective prior generations of maturity models as indicated in FIG. 3B.

In the described example of FIG. 4 with the regression line illustrative for topic 5 plotted, manager system 110 can predict that at the subsequent time Gen (next) that a topic strength for topic 5 can exceed threshold 4102. Manager system 110 can be configured so that conditionally on a topic strength for topic 5 exceeding threshold 4102 and in some embodiments further conditionally on the slope of the regression line for topic 5 being positive can identify topic 5 as a potential topic for inclusion as the domain in the current generation of the maturity model being developed. Accordingly, based on manager system 110 at block 1113 determining that topic 5 is a potential topic for inclusion as a domain in the current generation of the maturity model being developed, manager system 110 at send block 1114 can send prompting data to core group expert users that prompts for the inclusion of the identified topic 5 in the current maturity model being developed.

At send block 1114, manager system 110 can send prompting data to core group expert users which can specify that topic 5 is to be considered as a domain in the current generation of the maturity model being developed. Such prompting data can specify on a displayed user interface, e.g., "Please consider [topic 5] as a domain in the current generation of the maturity model." In the described example where topic 5 is prompted for inclusion as a domain in a maturity model, the identification of topic 5 as a potential new domain can be based on the NLP processing of research document data and/or survey response data at block 1113 resulting in the Gen 5 parameter values specified in FIG. 4 in causing the regression line for topic 5 to exceed the strength threshold 4102 at the subsequent time, Gen (next). Accordingly, there is set forth herein, according to one embodiment, a method that includes processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user, wherein the method includes evaluating natural language processing parameter values extracted from one or more maturity model document (e.g., a survey result document) against predicted natural language processing parameter values of the maturity model in a generation subsequent to the second maturity model (e.g., the predicted regression line topic strength parameter values for time Gen (next) as shown in FIG. 4), wherein predicting the natural language processing parameter values in the generation subsequent to the second maturity model has included querying a predictive model that has been trained with training data defined by natural language processing parameter values derived from natural language processing of documents of the maturity model and the second maturity model, wherein the method includes identifying an emerging topic from the evaluating, and wherein the generating the prompting data is in dependence on the identifying, and wherein the presenting the prompting data includes presenting the prompting data to core group expert users so that the core group expert users specify a domain for the maturity model in the generation subsequent to the second maturity model in accordance with the identified emerging topic.

Regression analytics depicted in FIG. 4, in another aspect, can result in prompting data being generated that prompts for the removal of one or more domain from a generationally advancing maturity model. In the described example of FIG. 4, based on the regression line for topic 6, manager system 110 can predict that at a subsequent time, Gen (next), a topic strength for topic 6 can fall below topic strength threshold 4102. Manager system 110 can be configured so that based on the predicted topic strength for topic 6 falling below topic strength threshold 4102 and based on the regression line for topic 6 being of negative slope, manager system 110 can prompt for the removal of topic 6 from an existing domain of the most recent generation of the maturity model.

Based on the identification of topic 6 as a topic for removal as a domain from a generationally advancing maturity model currently being developed, manager system 110 at send block 1114 can send prompting data to core group expert users prompting for the removal of topic 6 from the current generation of the maturity model currently being developed. Such prompting data can include such prompting data such as the text message "please consider removing [topic 6] as a domain from the maturity model".

Trends-based machine learning predictions can also be employed by manager system 110 for validating provisional maturity model specifications that are produced based on input from core group expert users. Referring to FIG. 2B, manager system 110 at block 1118 can produce a provisional maturity specification document defining a provisional maturity model specification document based on guided input from core group expert users at preceding blocks. At iterations of block 1119, manager system 110 can subject the provisional maturity model specification document to natural language processing for extraction of a parameter value dataset and at iterations of block 1120, manager system 110 can perform processing of the parameter value dataset extracted at block 1119.

e processing of block 1120 can include comparing the parameter value dataset extracted at the preceding iteration of block 1119 to parameter value datasets extracted from one or more previous generation of the current maturity model for a certain industry mission. Processing at block 1120, according to one embodiment, can be understood with reference again to FIG. 4.

In one embodiment for purposes of description, the current generation of maturity model being developed at blocks 1119 and 1120 can be a Gen 6 maturity model, wherein the most recent generation of the maturity model in production is Gen 5. In reference to FIG. 4, topic strength parameter values for the prior generations of a maturity model specification output at prior iterations of block 1122 are plotted in FIG. 4. The plotted regression lines for topics 1 through 6 specify the predicted topic strength values for topics 1 through 6 at the time Gen (next), which in the described example, corresponds to the time of Gen 6 of the current maturity model being developed. NLP processing at block 1119 in the described example, can result in the dataset values being generated as specified for provisional maturity model specification as set forth in FIG. 4, wherein topic strengths for topics 1 through 6 are extracted from the provisional maturity model specification document by subjecting the provisional maturity specification document output put at block 1118 to natural language processing.

At processing block 1120 in the described example, manager system 110 can compare natural language processing parameter values extracted from processing the provisional maturity model specification document output at block 1118 to the predicted natural language processing parameter values predicted based on the regression lines for topics 1 through 6 as is specified in FIG. 4.

At processing block 1120, manager system 110 can validate or alternatively disqualify the provisional maturity specification document. In one illustrative embodiment, manager system 110 can validate or alternatively disqualify a provisional maturity specification document based on extracted topic strengths of the provisional maturity specification document having values within a threshold range of their predicted values predicted using the predicted values of FIG. 4 predicted using the regression based predictive model trained by machine learning using training values. In the described example, the extracted topic strengths for topics 1, 2, 4, 5, and 6 can be validated based on those topic strengths having values within a threshold range of their predicted values predicted based on the regression lines of FIG. 4.

However, in reference to FIG. 4 the extracted topic strength for topic 3 as indicated by data value 4104 can have a value outside of a threshold range and manager system 110 can thus disqualify the production maturity specification document output at block 1122 from validating. Based on the data value 4104 being out of range, manager system 110 at block 1121 can disqualify and invalidate provisional maturity specification document output at block 1118 and at the next iteration, the prompting data send block 1114 can send prompting data notifying core group expert users that a topic strength for topic 3 is out of range.

Such prompting data can include the prompt, e.g., provisional maturity model document is invalidated based on topic 3 being out of range. Prompting data sent at block 1114 to core group expert users can include such prompting data as "Provisional maturity model specification model document has not been validated. Please consider content regarding [topic 3] which is out of range." Based on the prompting data, the core group expert users using core group expert UE devices 130A-130Z can specify a revised provisional maturity specification document. The process seen at blocks 1118 to 1121 can proceed on an iterative loop until a valid provisional maturity specification document is produced and validated. The described processing described in reference to blocks 1118 to 1120 in FIG. 4 can reduce subjectivity and bias in a produced maturity specification document. Embodiments herein recognize that outputs of the type described with reference to extraneous data value 4104 (FIG. 4) can occur where a core group expert user is present having subjective and biased opinions not shared by other core group expert users and widely differentiated from other core group expert users. Thus, the described processing can reduce subjectivity and bias in an output production maturity specification document that can be output at block 1122. Topic strength extraction depicted in FIG. 4 can be performed. The identification of an out of range data point, such as extraneous data value 4104 by manager system 110, can result from an objectively applied criterion that is applied the same across all provisional maturity model specification documents, thus reducing subjectivity, bias, and human error. There is set forth herein the method including processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing of the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset; generating prompting data in dependence on a result of the comparing; and presenting the prompting data to a user, wherein the method includes evaluating natural language processing parameter values extracted from provisional maturity model specification document (e.g., at block 1118) produced based on input from core group expert users against predicted natural language processing parameter values of the maturity model in a generation subsequent to the second maturity model (e.g., at time gen (next) at FIG. 4), wherein predicting the natural language processing parameter values in the generation subsequent to the second maturity model has included querying a predictive model (e.g., a regression based predictive model as set forth in FIG. 4) that has been trained with training data defined by natural language processing parameter values derived from natural language processing of documents of the maturity model and the second maturity model, wherein the generating the prompting data is in dependence on the evaluating, and wherein the presenting the prompting data includes presenting the prompting data to the core group expert users, wherein the prompting data is configured to prompt the core group expert users to present inputs for the production of a revised provisional maturity model, wherein the comparing includes establishing the predictive model trained by the training data defined by natural language processing parameter values derived from natural language processing of documents of the maturity model and the second maturity model.

In one use case, the dataset data of FIG. 4 can represent dataset data across an entire maturity model specification, that is, across a plurality of different domains. In another illustrative use case example, the dataset data of FIG. 4, specifying topic strength parameter values can represent topic strength parameter values intrinsic to a single domain out of the set of domains defining a maturity model. Manager system 110 can perform machine learning predictive analytics as illustrated in FIG. 4 on a domain by domain basis, wherein datasets used for predictive model training are provided on a domain by domain basis.

Where manager system 110 extracts topic strength parameter values within individual maturity model domains, emerging topics such as topic 5 depicted in FIG. 4 can be identified as candidate new capabilities within a particular domain. In one aspect, manager system 110 can be configured to guide maturity level designations for new capabilities that are identified as emerging within a domain.

Figure 5:
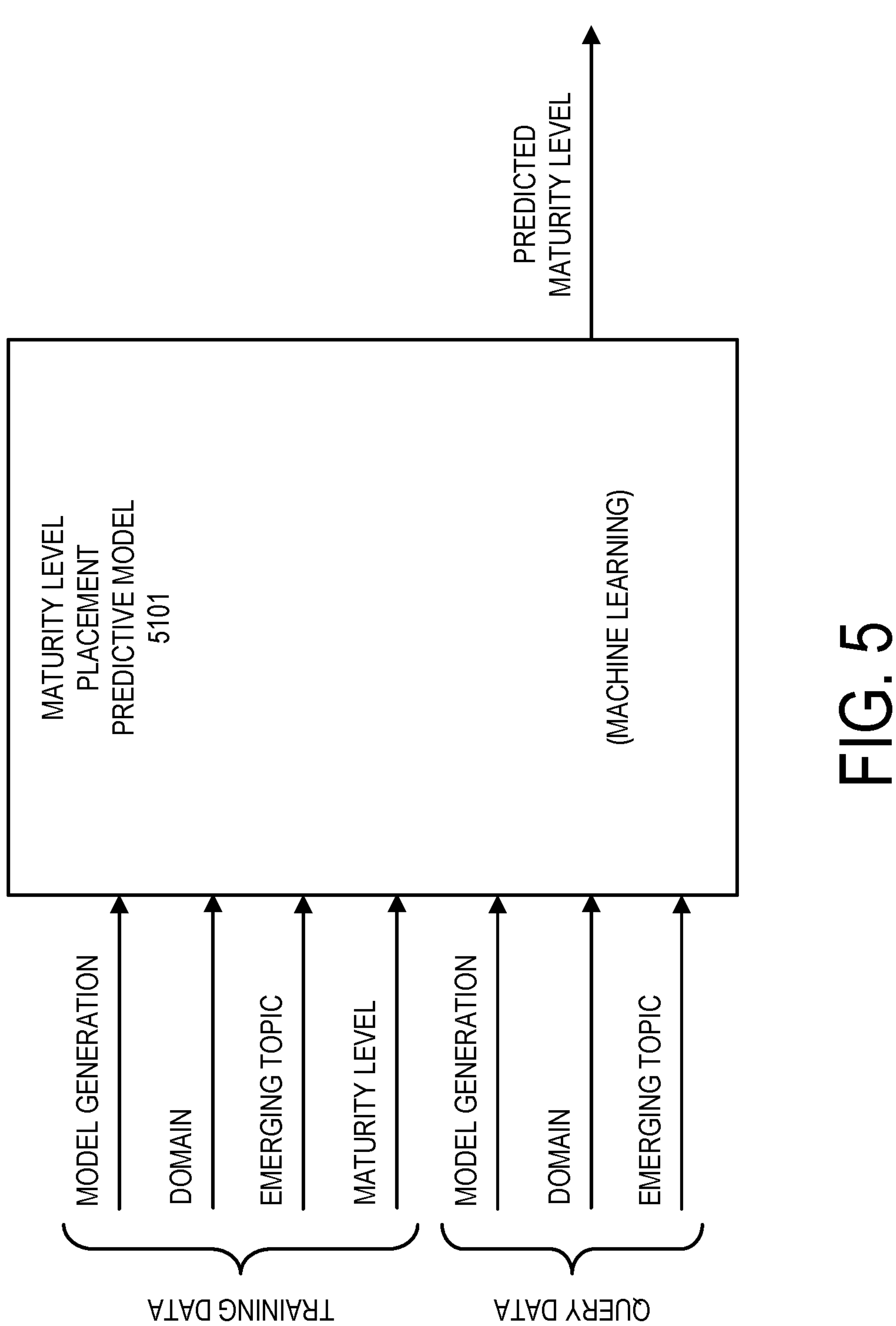
FIG. 5 is a machine learning predictive model trained by historical generational maturity model datasets, according to one embodiment.
Figure 6A:
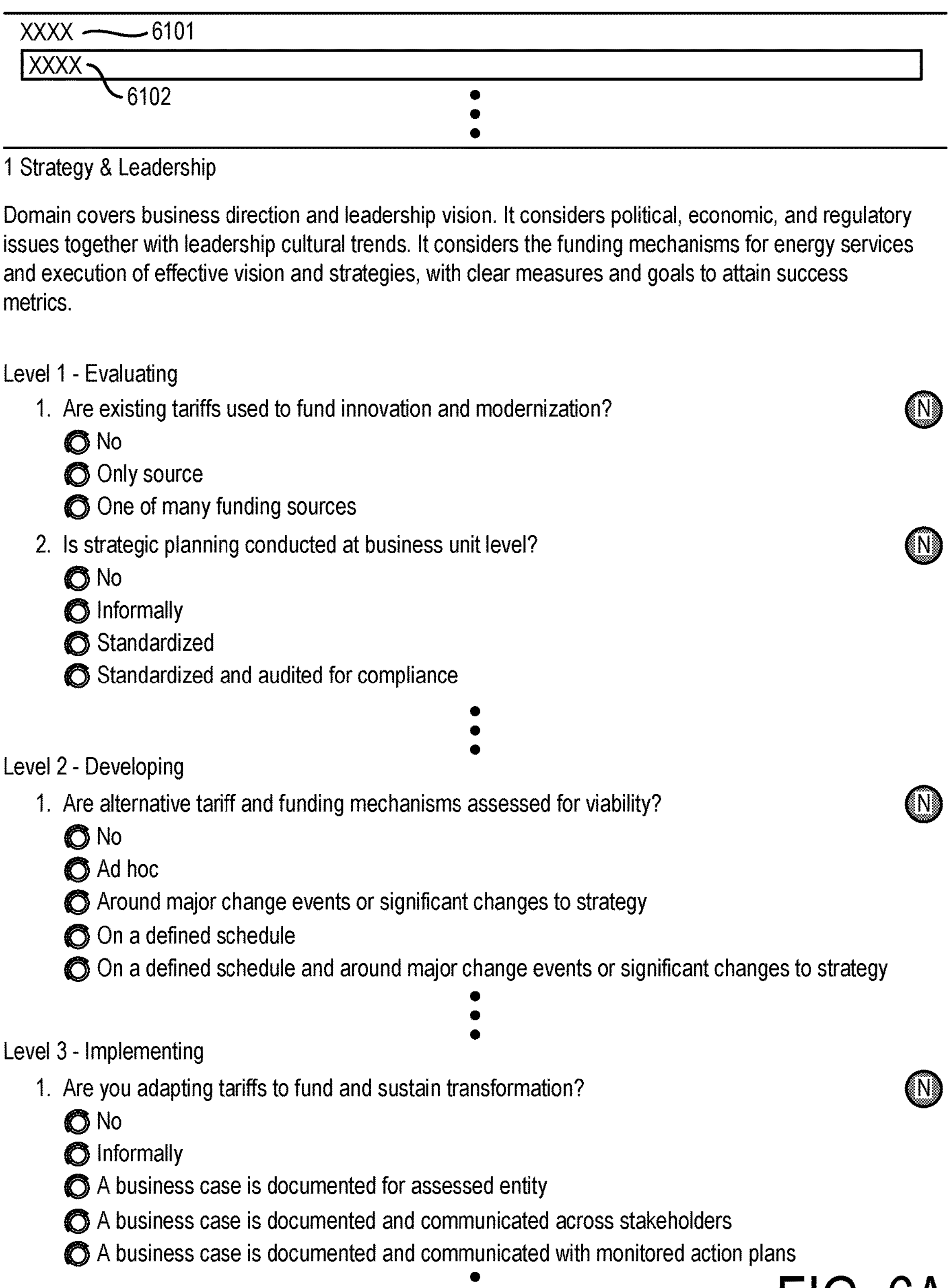
Figure 6C:
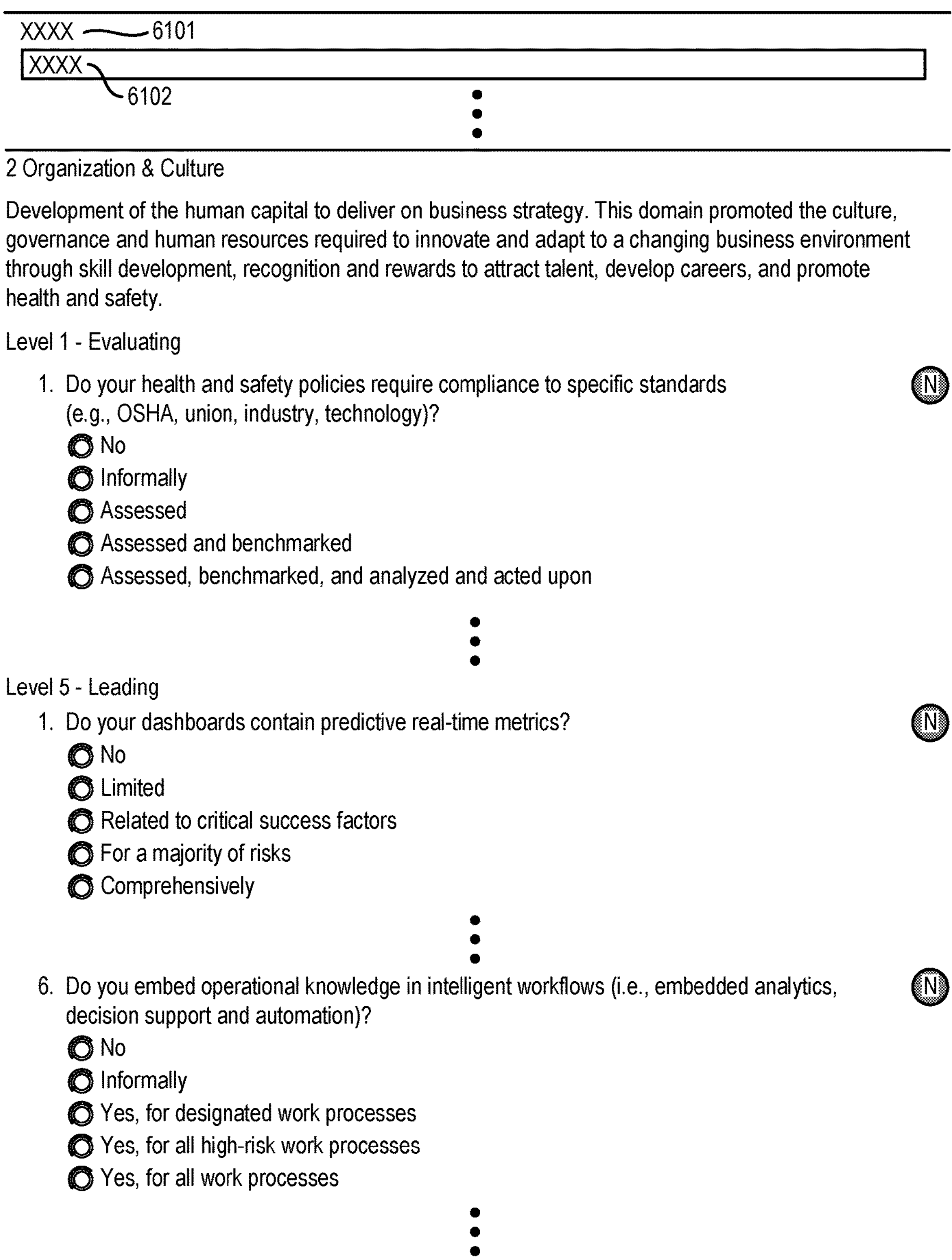
Figure 6G:
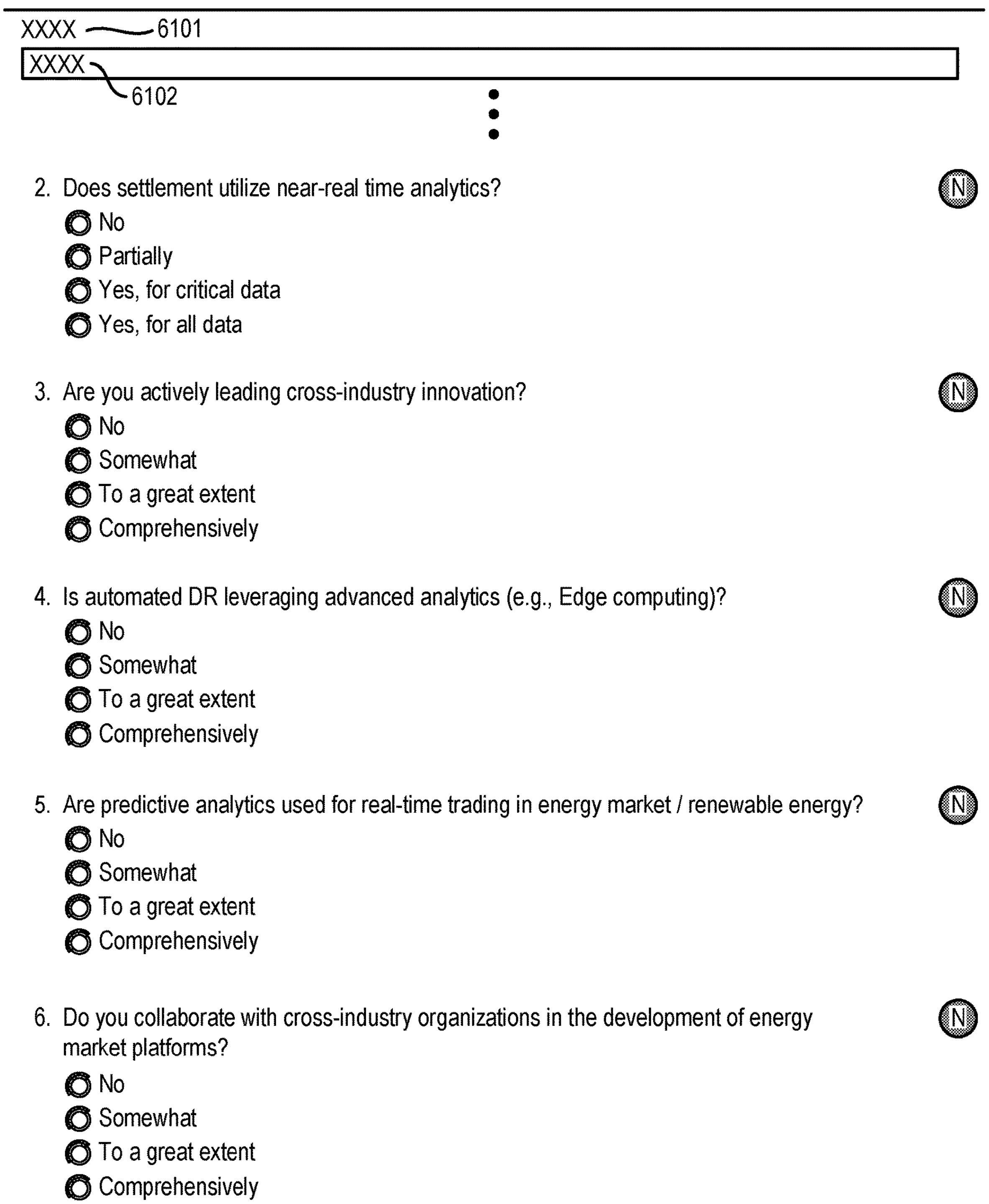

FIG. 5 illustrates a predictive model that can be trained with machine learning training data to predict a maturity level assignment associated to a new emerging capability identified as being emerging within a domain, e.g., as illustrated with reference to topic 5 of FIG. 4. Training data for training maturity level placement predictive model 5101 can include training data across multiple different maturity models associated to different industry mission (a clean electrification industry mission, transportation congestion management industry mission, waste removal for municipality industry mission, cyber security industry mission, etc.), wherein each respective industry mission maturity model can include a plurality of successive generations. Manager system 110 can be configured to predict appropriate maturity level assignments using a machine learning model that is trained with training data obtained from multiple different maturity models associated to different industry missions.

Maturity level placement predictive model 5101 can be trained with iterations of training data extracted from historical maturity models, wherein the respective iterations of training data can include for a historical validate maturity model specification document (a) the designation for model generation e.g., Gen 1, Gen 2, Gen 3 and so on, of the historical validate maturity model specification document, (b) the domain in which the emerging capability was identified, (c) the emerging capability identified, and (d) the assigned maturity level of the emerging capability of the historical validated maturity model specification document previously validated by manager system 110. It will be noted that manager system 110 can be iteratively running blocks 1101 to 1129 for a plurality of different maturity models across a plurality of different industry missions, wherein there can be multiple generations of the maturity model for each industry mission. Manager system 110 can be configured so that responsively to a maturity model specification document being validated at block 1120 wherein the maturity model specification document specifies a maturity level assignment for a capability identified as emerging (as indicated in reference to topic 5 of FIG. 4), manager system 110 can apply a new iteration of training data with the attributes of (a)-(d) for training maturity level placement predictive model 5101.

At the completion of each iteration of block 1122 wherein the maturity model specification document specifies a maturity level assignment for a capability identified as emerging, manager system 110 can apply a new iteration of training data to maturity level placement predictive model 5101, wherein each iteration of training data includes (a) a specifier for model generation, (b) domain, (c) emerging topic (recognized as a capability), and (d) maturity level that was assigned and validated for the emerging topic recognized as a capability. Trained as described, maturity level placement predictive model 5101 is able to learn an historical relationship between model generation domain emerging topics mapping to a capability and assigned maturity level that was assigned and validated.

Trained as described, maturity level placement predictive model 5101 is able to leverage by use of training data, historical data obtained with respect to multiple multi-generation maturity models across a variety of different industry missions.

So that manager system 110 can resolve differences in topic labels (e.g., for domains or capabilities) across maturity models associated to different industry missions, training data defined by domain and capabilities topics (including emerging topics) can be expressed in vectorized form, e.g., using a word to vector technique, e.g., word2vec processing, wherein differentiated topics can be expressed in vector space to permit similarities analysis between differentiated terms including terms mapping to topics.

Maturity level placement predictive model 5101, once trained, can be configured to respond to query data. Referring again to the flowchart of FIG. 2A-2B, query data for querying maturity level placement predictive model 5101 at block 1120 based on topic 5 being identified as emerging in response to processing dataset data of a provisional maturity specification output at block 1118 can include a dataset that comprises (i) a model generation identifier, (ii) a domain in which an emerging topic is observed, and (iii) the identified emerging topic. In response to the described query data, maturity level placement predictive model 5101 can return a prediction as to maturity level placement for the detected emerging topic. Returning to the described example of FIG. 4, emerging topic 5 exceeding threshold 4102 can be identified as an emerging capability associated to a domain of a set of domains in a current maturity model being developed. As noted in the described scenario, maturity model generation can be Gen 6 (Gen 6 being developed). Further to the referenced example, the domain can be domain 1 of the maturity model in one example and the emerging topic recognized as an emerging capability can be topic 5 as noted in reference to FIG. 4.

Querying maturity level placement predictive model 5101 with the dataset described, maturity level placement predictive model 5101 can return a predicted maturity level placement for the emerging topic identified as mapping to an emerging capability of a certain domain. Based on the described output from maturity level placement predictive model 5101, wherein maturity level 3 is output as the predicted maturity level placement using maturity level placement predictive model 5101, manager system 110 at ensuing prompting data sending block 1114 can send prompting data for presentment on a displayed user interface prompting core group expert users to specified maturity level 3 for the identified emerging capability mapping to topic 5 in the described example. Accordingly, configured as described, manager system 110 can leverage historical data across maturity models for different industry missions to provide guidance to core group expert users in regard to the maturity level placement of identified new capabilities associated to maturity model. Accordingly, there is set forth herein the method including processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset; processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model; comparing the second maturity model to the maturity model, wherein the comparing is performed in dependence on at least one value of the parameter value dataset and at least one value of the second parameter value dataset (e.g., the comparing can include use of regression analytics as set forth in FIG. 4); generating prompting data in dependence on a result of the comparing; and presenting the prompting data to a user, wherein the method includes identifying an emerging capability associated to a domain of the second maturity model (e.g. topic 5 can be identified as part of processing in relation to a provisional maturity model specification document at block 1120) in dependence on the comparing, and wherein the method includes querying a maturity level placement predictive model 5101 for predicting a maturity level placement for the identified emerging capability, wherein the maturity level placement predictive model 5101 has been trained with historical maturity model data of a plurality of maturity models associated to a plurality of different industry missions, wherein the prompting data prompts the user to specify a maturity level assignment for the emerging topic in accordance with the predicted maturity level placement.

Various available tools, libraries, and/or services can be utilized for implementation of the predictive model of FIG. 4 and/or predictive model 5101 as shown in FIG. 5. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g., retrieval of metadata for a given predictive model, deployment of models and management of deployed models, online deployment, scoring, batch deployment, stream deployment, monitoring and retraining deployed models. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. The predictive model of FIG. 4 and/or predictive model 5101 as shown in FIG. 5. can include use of, e.g., regression-based analytics, support vector machines (SVM), Bayesian networks, neural networks and/or other machine learning technologies featuring a predictive model trained by applied training data.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The computer implemented method can also include processing one or more text based maturity model document of a maturity model, where the maturity model specifies a plurality of domains, and for at least one domain of the plurality of domains, capabilities are associated to respective different maturity levels of the at least one domain, where the processing the one or more text based maturity model document includes applying natural language processing to extract from the one or more text based document a parameter value dataset; processing one or more maturity model text document of a second maturity model, where the second maturity model specifies a second plurality of domains, and for at least one domain of the second plurality of domains, capabilities are associated to respective different maturity levels of the at least one domain, where the processing the one or more maturity model text document includes applying natural language processing to extract from the one or more maturity model text document a second parameter value dataset, where the second maturity model is a subsequent generation of the maturity model; comparing the second maturity model to the maturity model, where the comparing is performed in dependence on at least one value of the parameter value dataset and at least one value of the second parameter value dataset; generating prompting data in dependence on a result of the comparing; and presenting the prompting data to a user. Other embodiments of this aspect include corresponding computer systems, apparatus, and computer programs recorded on one or more computer storage devices, each configured to perform the actions of the methods.

Implementations may include one or more of the following features. The computer implemented method where the method includes obtaining text based documents associated to candidate core group expert users, subjecting the text based documents to natural language processing to extract natural language processing parameter value datasets associated to respective candidate core group expert users, where the method includes selecting invitee core group expert users from the candidate core group expert users in dependence on an emerging topic identified in the second maturity model, where identifying the emerging topic has resulted from the comparing the second maturity model to the maturity model. The method includes obtaining text based documents associated to candidate core group expert users, subjecting the text based documents to natural language processing to extract natural language processing parameter value datasets associated to respective candidate core group expert users, where the method includes selecting invitee core group expert users from the candidate core group expert users in dependence on an emerging topic identified in the second maturity model, where identifying the emerging topic has resulted from the comparing the second maturity model to the maturity model, where the selecting includes evaluating a topic strength profile of the candidate core group expert users against a predicted topic strength profile of the maturity model in a generation subsequent to the second maturity model. The method includes obtaining text based documents associated to candidate core group expert users, subjecting the text based documents to natural language processing to extract natural language processing parameter value datasets associated to respective candidate core group expert users, where the method includes selecting invitee core group expert users from the candidate core group expert users in dependence on an emerging topic identified in the second maturity model, where identifying the emerging topic has resulted from the comparing the second maturity model to the maturity model, where the selecting includes evaluating a topic strength profile of the candidate core group expert users against a predicted topic strength profile of the maturity model in a generation subsequent to the second maturity model, where predicting of the topic strength profile of the maturity model in the generation subsequent to the second maturity model has included querying a predictive model that has been trained with training data defined by natural language processing parameter values derived from natural language processing of documents of the maturity model and the second maturity model. The method includes selecting invitee core group expert users from candidate core group expert users, where the selecting includes evaluating natural language processing parameter values of the candidate core group expert users against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model. The method includes evaluating natural language processing parameter values extracted from one or more maturity model document against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model. The method includes evaluating natural language processing parameter values extracted from one or more maturity model document against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model, where the method includes identifying an emerging topic from the evaluating, and where the generating the prompting data is in dependence on the identifying, and where the presenting the prompting data includes presenting the prompting data to core group expert users so that the core group expert users specify a domain for the maturity model in the generation subsequent to the second maturity model in accordance with the identified emerging topic. The method includes evaluating natural language processing parameter values extracted from one or more maturity model survey result document against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model, where the method includes identifying an emerging topic from the evaluating, and where the generating the prompting data is in dependence on the identifying, and where the presenting the prompting data includes presenting the prompting data to core group expert users so that the core group expert users specify a domain for the maturity model in the generation subsequent to the second maturity model in accordance with the identified emerging topic. The method includes evaluating natural language processing parameter values extracted from provisional maturity model specification document produced based on input from core group expert users against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model. The method includes evaluating natural language processing parameter values extracted from provisional maturity model specification document produced based on input from core group expert users against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model, where the generating the prompting data is in dependence on the evaluating, and where the presenting the prompting data includes presenting the prompting data to the core group expert users, where the prompting data is configured to prompt the core group expert users to present inputs for the production of a revised provisional maturity model. The method includes evaluating natural language processing parameter values extracted from provisional maturity model specification document produced based on input from core group expert users against predicted natural language processing parameter values of the maturity model in a generation subsequent to the second maturity model, where predicting the natural language processing parameter values in the generation subsequent to the second maturity model has included querying a predictive model that has been trained with training data defined by natural language processing parameter values derived from natural language processing of documents of the maturity model and the second maturity model, where the generating the prompting data is in dependence on the evaluating, and where the presenting the prompting data includes presenting the prompting data to the core group expert users, where the prompting data is configured to prompt the core group expert users to present inputs for the production of a revised provisional maturity model, where the comparing includes establishing the predictive model trained by the training data defined by natural language processing parameter values derived from natural language processing of documents of the maturity model and the second maturity model. The one or more text based document includes a production document that specifies the plurality of domains of the maturity model. The one or more text based document includes a source document. The prompting data prompts the user to revise the second maturity model. The method includes identifying an emerging capability associated to a domain of the second maturity model in dependence on the comparing, and where the method includes querying a maturity level placement predictive model for predicting a maturity level placement for the identified emerging capability, where the maturity level placement predictive model has been trained with historical maturity model data of a plurality of maturity models associated to a plurality of different industry missions, where the prompting data prompts the user to specify a maturity level assignment for the emerging topic in accordance with the predicted maturity level placement. The prompting data prompts the user to join a core group of expert users of a generationally advancing maturity model, where the maturity model is a preceding version of the generationally advancing maturity model. Where the prompting data prompts the user to specify a maturity level assignment for an identified emerging capability. The prompting data prompts the user to add a domain to the second maturity model. Implementations of the described techniques may include hardware, a method or process, or computer software on a computer-accessible medium.

One general aspect includes a computer readable storage medium readable by one or more processing circuit and storing instructions for execution by one or more processor for performing a method may include: processing one or more text based maturity model document of a maturity model, where the maturity model specifies a plurality of domains, and for at least one domain of the plurality of domains, capabilities are associated to respective different maturity levels of the at least one domain, where the processing the one or more text based maturity model document includes applying natural language processing to extract from the one or more text based document a parameter value dataset; processing one or more maturity model text document of a second maturity model, where the second maturity model specifies a second plurality of domains, and for at least one domain of the second plurality of domains, capabilities are associated to respective different maturity levels of the at least one domain, where the processing the one or more maturity model text document includes applying natural language processing to extract from the one or more maturity model text document a second parameter value dataset, where the second maturity model is a subsequent generation of the maturity model; comparing the second maturity model to the maturity model, where the comparing is performed in dependence on at least one value of the parameter value dataset and at least one value of the second parameter value dataset; generating prompting data in dependence on a result of the comparing; and presenting the prompting data to a user. Other embodiments of this aspect include corresponding computer systems, apparatus, and computer programs recorded on one or more computer storage devices, each configured to perform the actions of the methods. One general aspect includes a memory; at least one processor in communication with the memory; and program instructions executable by one or more processor via the memory to perform a method may include: processing one or more text based maturity model document of a maturity model, where the maturity model specifies a plurality of domains, and for at least one domain of the plurality of domains, capabilities are associated to respective different maturity levels of the at least one domain, where the processing the one or more text based maturity model document includes applying natural language processing to extract from the one or more text based document a parameter value dataset; processing one or more maturity model text document of a second maturity model, where the second maturity model specifies a second plurality of domains, and for at least one domain of the plurality of domains, capabilities are associated to respective different maturity levels of the at least one domain, where the processing the one or more maturity model text document includes applying natural language processing to extract from the one or more maturity model text document a second parameter value dataset, where the second maturity model is a subsequent generation of the maturity model; comparing the second maturity model to the maturity model, where the comparing is performed in dependence on at least one value of the parameter value dataset and at least one value of the second parameter value dataset; generating prompting data in dependence on a result of the comparing; and presenting the prompting data to a user. Other embodiments of this aspect include corresponding computer systems, apparatus, and computer programs recorded on one or more computer storage devices, each configured to perform the actions of the methods.

Certain embodiments herein may offer various technical computing advantages involving computing advantages to address problems arising in the realm of computer networks. Embodiments herein can guide updating of maturity models so that over time maturity models are optimized for purposes of advancing maturity of enterprises. A maturity model herein can refer to a specification that specifies a set of domains and for each respective domain of the maturity model capabilities that are associated to different respective maturity levels of the domain. That is, for a given domain of the maturity model for a certain industry, the domain can include set of different maturity levels, e.g., level 1, level 2, level 3 and level 4 and level 5. In the respective ones of the maturity levels, the maturity levels can include respective associated capabilities. When an enterprise exhibits the capabilities associated to a certain level within a domain, the enterprise can be designated as having achieved the maturity level, e.g., a certain level of between level 1 and level 5 associated with that capability. Embodiments herein recognize that, in use, a maturity model can assist enterprises in advancing its own maturity in respect to an industry associated to a maturity model. Example industry missions can include, e.g., clean electrification, transportation congestion management, waste removal for municipality, cyber security, etc. Embodiments herein recognize that existing maturity models can be overly reliant on human decisions, which can be susceptible to subjectivity, bias and error. Embodiments herein can include various features that guide and assist, e.g., with use of user interface prompts expert users in the generation of maturity models. Embodiments herein recognize that existing maturity models can be overly reliant on human decisions, which can be susceptible to bias and error. Embodiments herein can include various features that guide and assist, e.g., with use of user interface prompts expert users in the generation of maturity models. Embodiments herein recognize that existing maturity models are inherently prone to subjective and biased determinations (e.g., influenced by emotion, personal preference, intuition, etc.) from core group expert users who define inputs to maturity models). Embodiments herein replace subjective determinations with objective determinations, and in dependence on text based processing can guide the development of objectively defined maturity models with use of real-time generated prompting data (e.g., without substantive user-perceivable delay) that can be presented to users, including core group expert users. Processing of text based data in various aspects set forth herein can detect trends incapable of being detected by humans, such as trends involving generationally emerging topics indicating the presence of new domains and generationally emerging topics indicating the presence of new capabilities within new domains. Embodiments herein can include features so that progression of a maturity models through generations is not dependent on human analysis and intervention. Rather, embodiments herein can detect latent trends incapable of being practically perceived by humans, and based on such detected latent trends can automatically prompt for the establishing of a new domain and/or capability associated to a new domain. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

In reference to FIG. 4 there is set forth a description of a computing environment 4100 that can include one or more computer 4101. In one example, a computing node as set forth herein can be provided in accordance with computer 4101 as set forth in FIG. 4.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
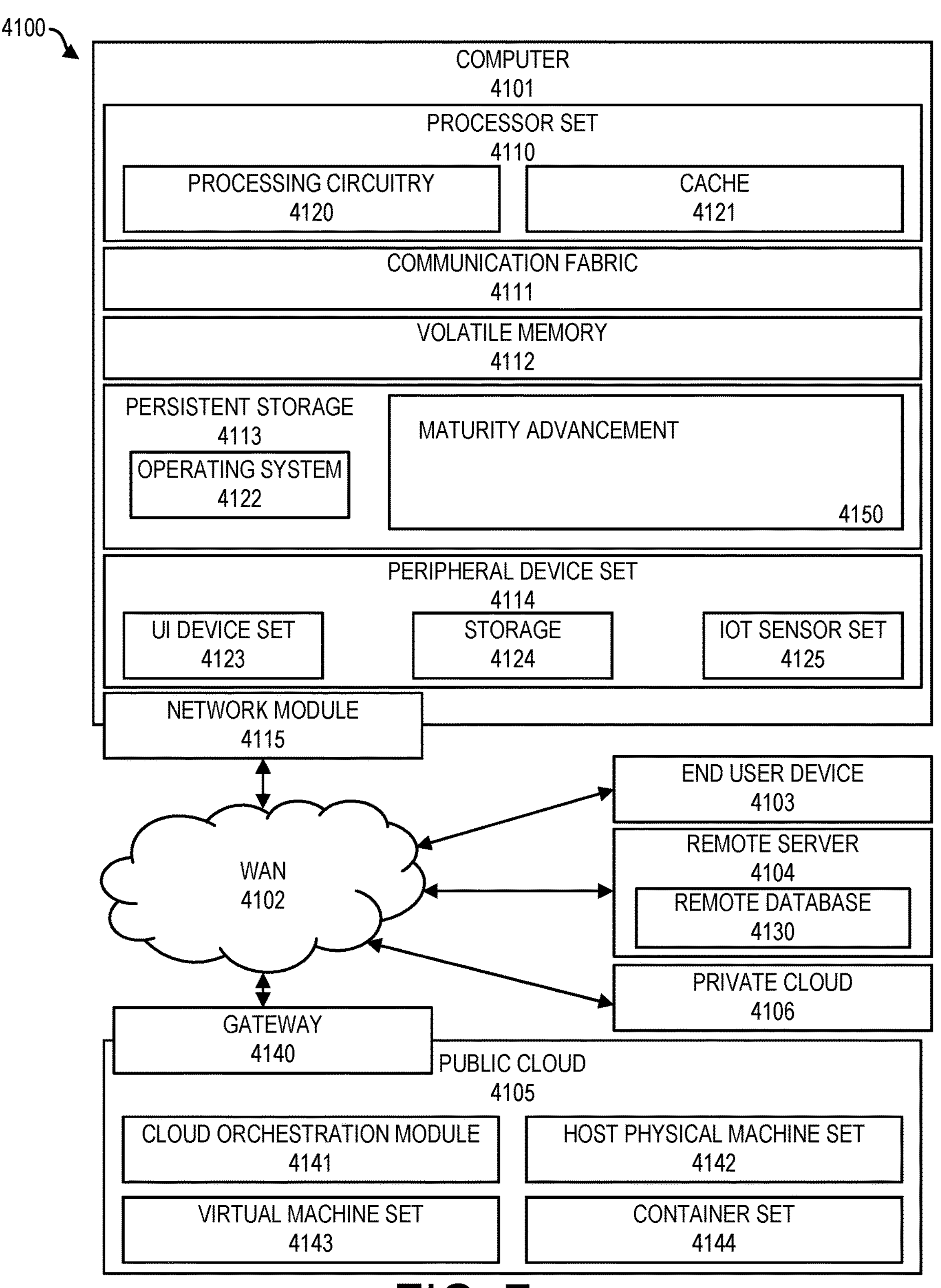
FIG. 7 depicts a computing environment according to one embodiment.

One example of a computing environment to perform, incorporate and/or use one or more aspects of the present invention is described with reference to FIG. 7. In one aspect, a computing environment 4100 contains an example of an environment for the execution of at least some of the computer code involved in performing the inventive methods, such as code 4150 for maturity advancement described with reference to FIGS. 1-6. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 7. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset;

processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model;

comparing the second maturity model to the maturity model, wherein the comparing is performed in dependence on at least one value of the parameter value dataset and at least one value of the second parameter value dataset;

wherein the comparing includes detecting latent generational trends that are not practically perceivable by humans, including statistically significant changes in domain or capability frequency;

generating prompting data in dependence on a result of the comparing;

wherein the prompting data comprises system-generated guidance to modify the maturity model, including at least one of splitting, merging, or restructuring domains or capabilities, based on the detected latent trends;

wherein the prompting data is generated without reliance on subjective human judgment and in accordance with a rule-based or statistical decision model; and presenting the prompting data to a user;

wherein the prompting data is presented in real-time, enabling automated maturity model progression that is free from human bias or intuition.

2. The computer implemented method of claim 1, further comprising obtaining text based documents associated to candidate core group expert users, subjecting the text based documents to natural language processing to extract natural language processing parameter value datasets associated to respective candidate core group expert users, wherein the method includes selecting invitee core group expert users from the candidate core group expert users in dependence on an emerging topic identified in the second maturity model, wherein identifying the emerging topic has resulted from the comparing the second maturity model to the maturity model.

3. The computer implemented method of claim 1, further comprising obtaining text based documents associated to candidate core group expert users, subjecting the text based documents to natural language processing to extract natural language processing parameter value datasets associated to respective candidate core group expert users, wherein the method includes selecting invitee core group expert users from the candidate core group expert users in dependence on an emerging topic identified in the second maturity model, wherein identifying the emerging topic has resulted from the comparing the second maturity model to the maturity model, wherein the selecting includes evaluating a topic strength profile of the candidate core group expert users against a predicted topic strength profile of the maturity model in a generation subsequent to the second maturity model.

4. The computer implemented method of claim 1, further comprising obtaining text based documents associated to candidate core group expert users, subjecting the text based documents to natural language processing to extract natural language processing parameter value datasets associated to respective candidate core group expert users, wherein the method includes selecting invitee core group expert users from the candidate core group expert users in dependence on an emerging topic identified in the second maturity model, wherein identifying the emerging topic has resulted from the comparing the second maturity model to the maturity model, wherein the selecting includes evaluating a topic strength profile of the candidate core group expert users against a predicted topic strength profile of the maturity model in a generation subsequent to the second maturity model, wherein predicting of the topic strength profile of the maturity model in the generation subsequent to the second maturity model has included querying a predictive model that has been trained with training data defined by natural language processing parameter values derived from natural language processing of documents of the maturity model and the second maturity model.

5. The computer implemented method of claim 1, further comprising selecting invitee core group expert users from candidate core group expert users, wherein the selecting includes evaluating natural language processing parameter values of the candidate core expert users against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model.

6. The computer implemented method of claim 1, further comprising evaluating natural language processing parameter values extracted from one or more maturity model document against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model.

7. The computer implemented method of claim 1, further comprising evaluating natural language processing parameter values extracted from one or more maturity model document against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model, wherein the method includes identifying an emerging topic from the evaluating, and wherein the generating the prompting data is in dependence on the identifying, and wherein the presenting the prompting data includes presenting the prompting data to core group expert users so that the core group expert users specify a domain for the maturity model in the generation subsequent to the second maturity model in accordance with the identified emerging topic.

8. The computer implemented method of claim 1, further comprising evaluating natural language processing parameter values extracted from one or more maturity model survey result document against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model, wherein the method includes identifying an emerging topic from the evaluating, and wherein the generating the prompting data is in dependence on the identifying, and wherein the presenting the prompting data includes presenting the prompting data to core group expert users so that the core group expert users specify a domain for the maturity model in the generation subsequent to the second maturity model in accordance with the identified emerging topic.

9. The computer implemented method of claim 1, further comprising evaluating natural language processing parameter values extracted from provisional maturity model specification document produced based on input from core group expert users against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model.

10. The computer implemented method of claim 1, further comprising evaluating natural language processing parameter values extracted from provisional maturity model specification document produced based on input from core group expert users against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model, wherein the generating the prompting data is in dependence on the evaluating, and wherein the presenting the prompting data includes presenting the prompting data to the core group expert users, wherein the prompting data is configured to prompt the core group expert users to present inputs for the production of a revised provisional maturity model.

11. The computer implemented method of claim 1, further comprising evaluating natural language processing parameter values extracted from provisional maturity model specification document produced based on input from core group expert users against predicted natural language processing parameter values of the maturity model in a generation subsequent to the second maturity model, wherein predicting the natural language processing parameter values in the generation subsequent to the second maturity model has included querying a predictive model that has been trained with training data defined by natural language processing parameter values derived from natural language processing of documents of the maturity model and the second maturity model, wherein the generating the prompting data is in dependence on the evaluating, and wherein the presenting the prompting data includes presenting the prompting data to the core group expert users, wherein the prompting data is configured to prompt the core group expert users to present inputs for the production of a revised provisional maturity model, wherein the comparing includes establishing the predictive model trained by the training data defined by natural language processing parameter values derived from natural language processing of documents of the maturity model and the second maturity model.

12. The computer implemented method of claim 1, wherein the one or more text based document includes a production document that specifies the plurality of domains of the maturity model.

13. The computer implemented method of claim 1, wherein the one or more text based document includes a source document.

14. The computer implemented method of claim 1, wherein the prompting data prompts the user to revise the second maturity model.

15. The computer implemented method of claim 1, further comprising identifying an emerging capability associated to a domain of the second maturity model in dependence on the comparing, and wherein the method includes querying a maturity level placement predictive model for predicting a maturity level placement for the identified emerging capability, wherein the maturity level placement predictive model has been trained with historical maturity model data of a plurality of maturity models associated to a plurality of different industry missions, wherein the prompting data prompts the user to specify a maturity level assignment for the emerging capability in accordance with the predicted maturity level placement.

16. The computer implemented method of claim 1, wherein the prompting data prompts the user to join a core group of expert users of a generationally advancing maturity model, wherein the maturity model is a preceding version of the generationally advancing maturity model.

17. The computer implemented method of claim 1, wherein the prompting data prompts the user to specify a maturity level assignment for an identified emerging capability.

18. A system comprising:

a memory;

at least one processor in communication with the memory; and program instructions executable by one or more processor via the memory to perform a method comprising:

processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset;

processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model;

comparing the second maturity model to the maturity model, wherein the comparing is performed in dependence on at least one value of the parameter value dataset and at least one value of the second parameter value dataset;

wherein the comparing includes detecting latent generational trends that are not practically perceivable by humans, including statistically significant changes in domain or capability frequency;

generating prompting data in dependence on a result of the comparing;

wherein the prompting data comprises system-generated guidance to modify the maturity model, including at least one of splitting, merging, or restructuring domains or capabilities, based on the detected latent trends;

wherein the prompting data is generated without reliance on subjective human judgment and in accordance with a rule-based or statistical decision model; and presenting the prompting data to a user;

wherein the prompting data is presented in real-time, enabling automated maturity model progression that is free from human bias or intuition.

19. The computer implemented method of claim 1, wherein presenting the prompting data to the user comprises presenting the prompting data via a user interface that includes selectable prompts corresponding to suggested model modifications, and wherein the user interface is configured to receive user input in response to the selectable prompts, the user input comprising at least one of: affirming the suggestion, modifying a capability or domain, or rejecting the suggestion.

20. A computer program product comprising:

a computer readable storage medium readable by one or more processing circuit and storing instructions for execution by one or more processor for performing a method comprising:

processing one or more text based maturity model document of a maturity model, wherein the maturity model specifies a plurality of domains, and for at least one domain of the plurality of domains, capabilities are associated to respective different maturity levels of the at least one domain, wherein the processing the one or more text based maturity model document includes applying natural language processing to extract from the one or more text based document a parameter value dataset;

processing one or more maturity model text document of a second maturity model, wherein the second maturity model specifies a second plurality of domains, and for at least one domain of the second plurality of domains, capabilities are associated to respective different maturity levels of the at least one domain, wherein the processing the one or more maturity model text document includes applying natural language processing to extract from the one or more maturity model text document a second parameter value dataset, wherein the second maturity model is a subsequent generation of the maturity model;

comparing the second maturity model to the maturity model, wherein the comparing is performed in dependence on at least one value of the parameter value dataset and at least one value of the second parameter value dataset;

wherein the comparing includes detecting latent generational trends that are not practically perceivable by humans, including statistically significant changes in domain or capability frequency;

generating prompting data in dependence on a result of the comparing;

wherein the prompting data comprises system-generated guidance to modify the maturity model, including at least one of splitting, merging, or restructuring domains or capabilities, based on the detected latent trends;

wherein the prompting data is generated without reliance on subjective human judgment and in accordance with a rule-based or statistical decision model; and presenting the prompting data to a user;

wherein the prompting data is presented in real-time, enabling automated maturity model progression that is free from human bias or intuition.

* * * * *